United States Patent
Kim et al.

(10) Patent No.: US 11,575,793 B2
(45) Date of Patent: Feb. 7, 2023

(54) SERVICE SYSTEM SUPPORTING VOICE CALL USING DIGITAL ASSISTANT DEVICE, METHOD THEREOF, AND NON-TRANSITORY COMPUTER READABLE MEDIUM HAVING COMPUTER PROGRAM RECORDED THEREON

(71) Applicant: SK Planet Co., Ltd., Seongnam-si (KR)

(72) Inventors: NamHoon Kim, Seoul (KR); DongKeun Kim, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 238 days.

(21) Appl. No.: 16/996,421

(22) Filed: Aug. 18, 2020

(65) Prior Publication Data

US 2021/0067633 A1    Mar. 4, 2021

(30) Foreign Application Priority Data

Aug. 30, 2019  (KR) .......................... 10-2019-0107352
Aug. 30, 2019  (KR) .......................... 10-2019-0107355

(51) Int. Cl.
| | |
|---|---|
| *H04M 7/00* | (2006.01) |
| *G10L 15/22* | (2006.01) |
| *H04M 3/24* | (2006.01) |
| *H04M 3/42* | (2006.01) |
| *H04M 7/12* | (2006.01) |

(52) U.S. Cl.
CPC ........... *H04M 7/0006* (2013.01); *G10L 15/22* (2013.01); *H04M 3/247* (2013.01); *H04M 3/42025* (2013.01); *H04M 7/127* (2013.01); *G10L 2015/223* (2013.01)

(58) Field of Classification Search
CPC ............... H04M 7/0006; H04M 3/247; H04M 3/42025; H04M 7/127
See application file for complete search history.

(56) References Cited

U.S. PATENT DOCUMENTS

2006/0003772 A1*  1/2006  Semper ................. H04W 88/02
                                                   455/458
2006/0073841 A1*  4/2006  Narasimha ............ H04W 68/12
                                                   455/445

\* cited by examiner

*Primary Examiner* — Brenda H Pham
(74) *Attorney, Agent, or Firm* — Fenwick & West LLP

(57) ABSTRACT

The present invention relates to a service system supporting a voice call using a digital assistant device, a method thereof, and a non-transitory computer readable medium having a computer program recorded thereon, and more particularly, to a service system which performs a call between a digital assistant device and a terminal corresponding to a call opponent through a voice command of a user and supports call conversion between the digital assistant device and a user terminal through the voice command of the user, a method thereof, and a non-transitory computer readable medium having a computer program recorded thereon.

6 Claims, 10 Drawing Sheets

SERVICE SYSTEM SUPPORTING VOICE CALL USING DIGITAL ASSISTANT DEVICE, METHOD THEREOF, AND NON-TRANSITORY COMPUTER READABLE MEDIUM HAVING COMPUTER PROGRAM RECORDED THEREON

CROSS-REFERENCE TO RELATED APPLICATIONS

This application claims the priority of Korean Patent Application Nos. 10-2019-0107352 filed on Aug. 30, 2019 and 10-2019-0107355 filed on Aug. 30, 2019, in the Korean Intellectual Property Office, which are incorporated by reference herein in their entirety.

BACKGROUND OF THE INVENTION

Field of the Invention

The present invention relates to a service system supporting a voice call using a digital assistant device, a method thereof, and a non-transitory computer readable medium having a computer program recorded thereon, and more particularly, to a service system which performs a call between a digital assistant device and a terminal corresponding to a call opponent through a voice command of a user and supports a call conversion to be made between the digital assistant device and a user terminal through the voice command of the user, a method thereof, and a non-transitory computer readable medium having a computer program recorded thereon.

Description of the Related Art

As home automation using digital assistant devices such as an artificial intelligence (AI) speaker has been generalized and the digital assistant devices are spreading like new home appliances such as AI speakers, there is an increasing need to make a voice call with a desired target by using the digital assistant devices.

In the case of an existing voice call using a digital assistant device, a method is known in which the corresponding digital assistant device has a telephone function and a voice call is performed by using a digital assistant device as an actual telephone when a voice call service is subscribed.

However, to this end, it is necessary to configure a telephone function in the digital assistant device, and there is a problem in that it is necessary to subscribe a voice call service that high costs continuously occur and subscription is inconvenient.

Further, even in the case of a provider which manufactures the digital assistant device or provides a service, there is a problem that it is required to be authenticated as a device for the voice call or authenticated as a communication provider for providing the service.

As another method, as a method of using a voice call terminal of the user, it is also known that a digital assistant device and a voice call terminal are connected to each other in a wired/wireless communication method to interface only voice input and output.

That is, when the digital assistant device having a speaker and a microphone is connected with the voice call terminal in a known short-range communication method for voice call such as Bluetooth and then a call between the voice call terminal and a call opponent terminal is actually connected, by a method of using the microphone and the speaker of the digital assistant device instead of a microphone and a speaker of the voice call terminal, there is a limitation that the voice call terminal and the digital assistant device need to be closed to each other, there is an inconvenience of operating the terminal because an operation subject of calling or ending is the voice call terminal, and there is a limitation that a service server for providing a digital assistant device service cannot be managed based on the corresponding voice call contents.

In addition, in existing calling methods using the digital assistant device, when the user wants to change a calling means from the digital assistant device to the user terminal of the user, there is an inconvenience in that the call connected by the digital assistant device is terminated and then the call needs to be connected again by the user terminal.

The above-described technical configuration is a background technique for assisting the understanding of the present invention, and does not mean a conventional technology widely known in the art to which the present invention belongs.

SUMMARY OF THE INVENTION

An object of the present invention is to provide a service system supporting a voice call using a digital assistant device, which uses a receiving terminal, but prevents an actual call through the receiving terminal and performs a call between a digital assistant device and a transmitting terminal through a voice command of a receiver, when connecting the call between the digital assistant device and the transmitting terminal by an overall control of a service server, a method thereof and a non-transitory computer readable medium having a computer program recorded thereon.

Another object of the present invention is to provide a service system supporting a voice call using a digital assistant device, which maintains a call connection between a receiving terminal and a transmitting terminal in parallel and provides a receiving alarm to the receiving terminal by using a phone number of the transmitting terminal as a transmitting number by a service server and/or a communication company server, when connecting the call between the digital assistant device and the transmitting terminal by an overall control of the service server, a method thereof and a non-transitory computer readable medium having a computer program recorded thereon.

Yet another object of the present invention is to provide a service system supporting a voice call using a digital assistant device, which uses a user terminal of a user, but prevents an actual call through the user terminal, and supports a call between the digital assistant device and an opponent terminal through a voice command of the user and supports conversion of a call connection with the opponent terminal between the digital assistant device and the user terminal through the voice command of the user, thereby increasing call convenience of the user, when connecting the call between the digital assistant device and the transmitting terminal by an overall control of the service server, a method thereof and a non-transitory computer readable medium having a computer program recorded thereon.

According to an embodiment of the present invention, a service method supporting a voice call using a digital assistant device may include a checking step of checking, by a service server, a digital assistant device associated with a receiving number and receiver information included in a call processing request signal transmitted from a communication company server; a call connecting step of attempting, by the service server, a call connection to the digital assistant device checked based on the call processing request signal while attempting a call connection to a receiving terminal corresponding the receiving number checked based on the call processing request signal through the communication company server; a response step of requesting, by the service server, a call connection between a transmitting terminal and the digital assistant device to the communication company server based on a response signal received from the digital assistant device which recognizes a voice command for a call connection request of the receiver in response to the call connection attempt; and a call connection step of maintaining, by the service server, a call channel between the digital assistant device and the transmitting terminal formed by the communication company server in response to the requested call connection.

As an example related with the present invention, before the checking step, the service method may further include checking, by the communication company server, identification information of the digital assistant device corresponding to the receiving number according to a call transmitting signal in identification information of the digital assistant device for each of a plurality of different receiving numbers pre-stored based on the receiving number included in the call transmitting signal received from the transmitting terminal and transmitting, to the service server, the call processing request signal including the transmitting number of the transmitting terminal and the receiving number according to the call transmitting signal and the checked identification information of the digital assistant device.

As an example related with the present invention, the service method may further include forming, by the communication company server, another call channel between the receiving terminal and the transmitting terminal in parallel when the call channel between the digital assistant device and the transmitting terminal is formed via the service server and the communication company server.

As an example related with the present invention, the service method may further include releasing, by the communication company server, a connection state of another call channel between the transmitting terminal and the receiving terminal when the call between the digital assistant device and the transmitting terminal is terminated.

As an example related with the present invention, the service method may further include generating, by the service server, recording information by recording a signal transmitted/received through the call channel according to a recording request signal received from the digital assistant device to transmit the generated recording information to the receiving terminal.

A non-transitory computer readable medium according to an embodiment of the present invention may record a computer program for functionalizing a computer to perform the service method supporting the voice call using the digital assistant device described above.

According to an embodiment of the present invention, a service system supporting a voice call using a digital assistant device may include a communication company server which checks identification information of a digital assistant device corresponding to a receiving number of a call transmitting signal by comparing the receiving number included in the call transmitting signal received from a transmitting terminal with identification information of the digital assistant device by a plurality of different receiving numbers pre-stored and transmits a call processing request signal including the checked identification information of the digital assistant device and the receiving number of the call transmitting signal; and a service server which attempts a call connection to the checked digital assistant device based on the call processing request signal while attempting a call connection to the receiving terminal corresponding to the checked receiving number of the receiving terminal through the communication company server based on the call processing request signal when receiving the call processing request signal from the communication company server and maintains a call channel between the digital assistant device and the transmitting terminal formed by the communication company server by requesting a call connection between the transmitting terminal and the digital assistant device to the communication company server based on a response signal when the response signal is received from the digital assistant device according to the call connection attempt.

As an example related with the present invention, the service system may further include a digital assistant device which generates the response signal when the voice command is the call connection request by recognizing a voice command of a receiver after receiving a receiving cal according to the call connection attempt of the service server to transmit the generated response signal to the service server.

As an example related with the present invention, the communication company server may form a first call channel between the digital assistant device and the transmitting terminal according to the call connection-related request of the service server and form a second call channel between the receiving terminal and the transmitting terminal.

As an example related with the present invention, the communication company server may release a connection state of the first and second call channels when the call between the digital assistant device and the transmitting terminal is terminated.

According to another embodiment of the present invention, a service method supporting a voice call using a digital assistant device, while forming a first call channel which is a call channel between a digital assistant device of a user and an opponent terminal as a call opponent via a service server and a communication company server by the service server and the communication company server communicating with the communication company server performing a call connection through a communication network, the service method may include a call conversion request step of transmitting, by the service server, a call conversion request signal to the communication company server when receiving a call conversion request message for changing a calling means to a user terminal of the user from the digital assistant device recognizing a call conversion-related voice command of the user; a change step of changing, by the communication company server, a second call channel between a user terminal and an opponent terminal in an idle state to a call connection state when forming the first call channel between the digital assistant device and the opponent terminal based on the call conversion request signal received from the service server; a termination step of terminating, by the service server, a call connection of the first call channel; and a call conversion step of medicating, by the service server and the communication company server, a voice signal transmitted/received between the user terminal and the opponent terminal by using the second call channel.

As an example related with the present invention, the call conversion request step may further include receiving, by the service server, the call conversion request message from the digital assistant device through an SIP protocol.

As an example related with the present invention, when the user terminal is the transmitting terminal and the opponent terminal is the receiving terminal, before the call conversion request step, the service method may further include receiving, by the service server, a voice command transmitted from the digital assistant device, identification information of the digital assistant device, and a call transmitting request signal and checking identification information of the transmitting terminal corresponding to the received identification information of the digital assistant device in the identification information of the transmitting terminal by identification information of a plurality of digital assistant devices pre-stored; requesting, by the service server, call transmission to the transmitting terminal corresponding to the checked identification information of the transmitting terminal; checking, by the service server, the digital assistant device associated with a special number and transmitter information included in the call processing request signal transmitted from the communication company server; checking, by the service server, receiver information based on the voice command received from the checked digital assistant device and performing a call connection function with the digital assistant device; requesting, by the service server, a receiving call connection with the receiving terminal corresponding to the receiver information based on the checked receiver information to the communication company server; and maintaining, by the service server, the first call channel between the digital assistant device and the receiving terminal formed by the communication company server in response to the requested receiving call connection.

As an example related with the present invention, the requesting of the call transmission to the transmitting terminal may include calling, by the service server, a dedicated application pre-installed in the transmitting terminal corresponding to the checked identification information of the transmitting terminal; and requesting, by the service server, call transmission to the transmitting terminal while the dedicated application is being executed in the transmitting terminal.

As an example related with the present invention, when the user terminal is the receiving terminal and the opponent terminal is the transmitting terminal, before the call conversion request step, the service method may include a checking step of checking, by the service server, a digital assistant device associated with a receiving number and receiver information included in a call processing request signal transmitted from the communication company server; a call connecting step of attempting, by the service server, a call connection to the digital assistant device checked based on the call processing request signal while attempting a call connection to a receiving terminal corresponding the receiving number checked based on the call processing request signal through the communication company server; a response step of requesting, by the service server, a call connection between the transmitting terminal and the digital assistant device to the communication company server based on a response signal received from the digital assistant device which recognizes a voice command for a call connection request of the receiver in response to the call connection attempt; and maintaining, by the service server, the first call channel between the digital assistant device and the transmitting terminal formed by the communication company server in response to the requested call connection.

As an example related with the present invention, before the checking step, the service method may further include checking, by the communication company server, identification information of the digital assistant device corresponding to the receiving number according to a call transmitting signal in identification information of the digital assistant device for each of a plurality of different receiving numbers pre-stored based on the receiving number included in the call transmitting signal received from the transmitting terminal and transmitting, to the service server, the call processing request signal including the transmitting number of the transmitting terminal and the receiving number according to the call transmitting signal and the checked identification information of the digital assistant device.

As an example related with the present invention, the service method may further include forming, by the communication company server, another second call channel between the user terminal and the opponent terminal in parallel when the first call channel between the digital assistant device and the opponent terminal is formed via the service server and the communication company server.

As an example related with the present invention, the service method may further include releasing, by the communication company server, a connection state of the second call channel between the user terminal and the opponent terminal when the call between the digital assistant device and the opponent terminal is terminated.

As an example related with the present invention, the service method may further include generating, by the service server, recording information by recording a signal transmitted/received through the first call channel or the second call channel according to a recording request signal received from the digital assistant device or the user terminal and then transmitting the generated recording information to the user terminal.

According to yet another embodiment of the present invention, a service method supporting a voice call using a digital assistant device while a call channel between a user terminal of a user and an opponent terminal as a call opponent is connected by a communication company server communicating with a service server, the service method may include receiving, by the service server, call conversion request-related call conversion request information including identification information of the user terminal and identification information of the opponent terminal generated through a dedicated application of the user terminal; checking, by the service server, a digital assistant device of the user based on the identification information of the digital assistant device pre-stored in response to the identification information of the user terminal according to the call conversion request information and attempting a call connection to the digital assistant device; requesting, by the service server, a call connection between the opponent terminal and the digital assistant device to the communication company server based on a response signal received from the digital assistant device which recognizes a call connection-related voice command of the user; and forming, by the communication company server, another call channel different from the call channel between the digital assistant device and the opponent terminal in response to the call connection-related request and converting the call channel between the user terminal and the opponent terminal to an idle state.

According to the present invention, a user may freely perform a call with a opponent terminal by a digital assistant device while the operation or control of a user terminal is unnecessary by using the user terminal of the user, but preventing an actual call through the user terminal and performing a call between the digital assistant device and the opponent terminal through a voice command of the user, when connecting the call between the digital assistant device and the opponent terminal by an overall control of a service server, thereby increasing convenience in use.

Further, according to the present invention, since the call contents between the receiver and the transmitter are recorded by the service server connecting the call between the digital assistant device and the transmitting terminal instead of the receiving terminal and the recording information on the generated call contents may be provided to the receiving terminal, even though the receiving terminal or the digital assistant device does not support a recording function, the service server provides a recording function, thereby increasing user's convenience to the recording.

Further, the present invention supports the user which is calling by the digital assistant device which recognizes and operates the voice command of the user and is callable with the opponent terminal to easily change the calling means to the user terminal by only the voice command for changing the calling means to the user terminal with respect to the digital assistant device. On the contrary, the present invention supports the user which is calling with the opponent terminal by using the user terminal to change the calling means to the digital assistant device from the user terminal by inputting the voice command to the digital assistant device when the call connection to the digital assistant device is attempted by the service server after the call conversion to the digital assistant device is requested to the service server by executing the dedicated application installed in the user terminal. In addition, the present invention supports the user to call with the opponent terminal easily by a desired calling means according to a situation, thereby greatly improving call convenience of the user using various calling means.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
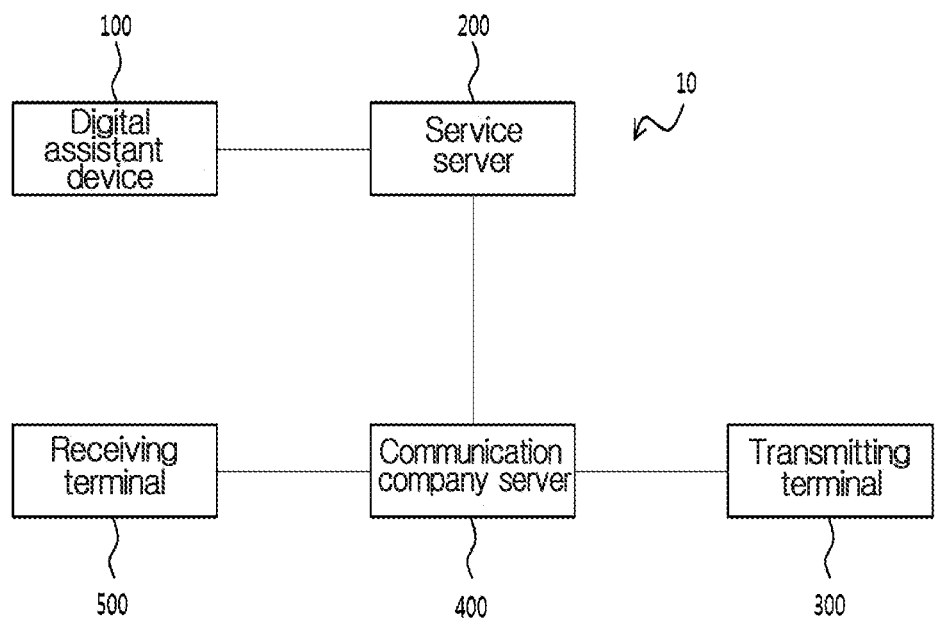
FIG. 1 is a block diagram illustrating a configuration of a service system supporting a voice call using a digital assistant device according to an embodiment of the present invention.

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, general terms used in the present invention should be analyzed as defined in a dictionary or according to front and back contexts and should not be analyzed as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

EXAMPLE 1

FIG. 1 is a block diagram illustrating a configuration of a service system 10 supporting a voice call using a digital assistant device according to an embodiment of the present invention.

As illustrated in FIG. 1, the service system 10 is configured by a digital assistant device 100, a service server 200, a transmitting terminal 300, a communication company server 400, and a receiving terminal 500. All components of the service system 10 illustrated in FIG. 1 are not required components, but the service system 10 may be implemented by more components than the components illustrated in FIG. 1 and may also be implemented by less components than the components illustrated in FIG. 1.

The transmitting terminal 300 transmits a call transmitting signal to the communication company server 400 with a receiving number corresponding to the receiving terminal 500 of a receiver.

The communication company server 400 checks identification information of the digital assistant device 100 corresponding to a receiving number according to the call transmitting signal in identification information of the digital assistant device by a plurality of different receiving numbers pre-stored based on the receiving number included in the call transmitting signal received from the transmitting number of the transmitting terminal 300.

At this time, the communication company server 400 may include an additional service server supporting an additional service for the call connection with the transmitting terminal 300 by the digital assistant device 100 corresponding to the receiving terminal 500 or the corresponding additional service server may be configured separately from the communication company server 400.

Further, in the additional service server, the identification information of the digital assistant device 100 may be pre-stored to correspond to (be matched with) the receiving number of the receiving terminal 500, and the identification information of the digital assistant device for each receiving number corresponding to each of a plurality of different receivers may be pre-stored in the additional service server.

In addition, the communication company server 400 may generate inquiry information on whether to subscribe an additional service including the receiving number according to the call transmitting signal to transmit the generated inquiry information to the additional service server.

Accordingly, the additional service server may retrieve the identification information of the digital assistant device for each receiving number pre-stored based on the receiving number included in the inquiry information, extract the identification information of the digital assistant device 100 corresponding to the receiving number according to the inquiry information, and then generate retrieval result information including the extracted identification information of the digital assistant device 100 to provide the generated retrieval result information to the communication company server 400.

Through this, when the identification information of the digital assistant device 100 is included in the retrieval result information based on the retrieval result information, the communication company server 400 may check that the corresponding receiving number is subscribed in the additional service for the call connection using the digital assistant device and transmit to the service server 200 a call processing request signal including the receiving number according to the transmitting number of the transmitting terminal 300 and the call transmitting signal, the identification information of the digital assistant device 100 according to the retrieval result information, etc.

At this time, the communication company server 400 may transmit a receiving call to the receiving terminal 500 in response to the call transmitting signal of the transmitting terminal 300 for the call connection between the transmitting terminal 300 and the receiving terminal 500 when the identification information of the digital assistant device 100 corresponding to the receiving number is not retrieved by the additional service server based on the retrieval result information.

Further, the service server 200 may check the digital assistant device 100 associated with the receiving number included in the call processing request signal transmitted from the communication company server 400 and receiver information.

Further, the service server 200 may attempt the call connection to the digital assistant device 100 checked based on the call processing request signal while attempting the call connection to the receiving terminal 500 corresponding to the receiving number of the receiving terminal 500 checked based on the call processing request signal by the communication company server 400.

Further, the service server 200 may perform a call connection function between the communication company server 400 and the digital assistant device 100 based on a response signal received in response to the call connection signal from the digital assistant device 100 corresponding to the receiving terminal 500 recognizing a voice command of the receiver for the call connection request and request the call connection between the transmitting terminal 300 and the digital assistant device 100 to the communication company server 400.

At this time, the communication company server 400 may form a first call channel between the digital assistant device 100 and the transmitting terminal 300 in response to the corresponding call connection request signal when receiving the call connection request-related call connection request signal between the digital assistant device 100 and the transmitting terminal 300 of the receiver transmitting the response signal from the service server 200.

Here, the call connection-related request signal may also be the response signal.

Further, the service server 200 may maintain the first call channel which is a call channel between the digital assistant device 100 and the transmitting terminal 300 formed by the communication company server 400 in response to the requested call connection via the communication with the communication company server 400 and the service server 200 may mediate a voice transmitted/received through the first call channel with the communication company server 400.

That is, the communication company server 400 may connect the first call channel (alternatively, a communication channel or a call session) among the digital assistant device 100, the service server 200, the communication company server 400, and the transmitting terminal 300.

At this time, the communication company server 400 may connect a second call channel, which is a call channel among the transmitting terminal 300, the communication company server 400, and the receiving terminal 500, independently and in parallel for charging simultaneously with the connection of the first call channel to stop the receiving call transmission to the receiving terminal 500 while maintaining the second call channel (call session) between the receiving terminal 500 and the transmitting terminal 300.

The digital assistant device 100 includes an artificial intelligence (AI) speaker/microphone, a microcontroller (or control unit) (not illustrated), a communication unit (not illustrated), a storage unit (not illustrated), etc.

Further, the digital assistant device 100 communicates with the service server 200, the transmitting terminal 300, etc. by a wired/wireless communication scheme.

Here, the receiving terminal 500 corresponding to the digital assistant device 100 may register information (or receiver information) associated with the receiving terminal 500 in the digital assistant device 100 in advance.

In addition, when the voice command (or voice) of the receiver received from the digital assistant device 100 is a voice command for a call connection for a call with the transmitting terminal 300, the digital assistant device 100 transmits a response signal including the identification information of the digital assistant device 100 according to the corresponding voice command to the service server 200. Here, the identification information of the digital assistant device 100 includes a mobile IP, a mobile MAC, a serial number, etc.

That is, the digital assistant device 100 receives a voice by the receiver (or the user) and performs a voice recognition function for the received voice. At this time, the digital assistant device 100 checks whether the voice received from the receiver is the voice of a pre-registered user (or user authentication) based on the pre-stored receiver information, and may also perform the voice recognition function for the corresponding received voice when the received voice corresponds to the voice of the pre-registered user. Here, the voice recognition function may be performed using various known technologies.

In addition, the digital assistant device 100 determines whether a voice command for the call connection is included in a result of performing the voice recognition function.

As the determining result, when the voice command for performing other control functions associated with the digital assistant device 100 is included in the result of performing the voice recognition function, the digital assistant device 100 performs other control functions associated with the digital assistant device 100 corresponding to the corresponding voice command.

For example, as the determining result, when a voice command of "Ari, turn the volume up one step" is included in the result of performing the voice recognition function, the digital assistant device 100 outputs a speaker output of the corresponding digital assistant device 100 to be increased by a predetermined first step. Here, "Ari" may be identification information (or identification name) for the corresponding digital assistant device 100.

Also, the digital assistant device 100 may output a predetermined sound corresponding to the receiving call when receiving the receiving call for attempting the call connection from the service server 200.

In addition, as the result of determining the voice command, when the voice command for the call connection is included in the result of performing the voice recognition function, the digital assistant device 100 generates a response signal for a call connection request corresponding to the receiving call to transmit the generated response signal to the service server 200.

In addition, when the call connection with a specific calling terminal 300 is failed in response to the response signal, the digital assistant device 100 receives information indicating that the call connection transmitted from the service server 200 has been failed.

Further, the digital assistant device 100 outputs information indicating that the received call connection has been failed.

Further, when the first call channel with the transmitting terminal 300 is normally connected by the control of the service server 200, the digital assistant device 100 performs a calling function with the transmitting terminal 300 connected to communication via the service server 200 and the communication company server 400.

Further, when the call between the digital assistant device 100 and the transmitting terminal 300 is terminated, the digital assistant device 100 terminates the call connection with the transmitting terminal 300 formed above.

At this time, the digital assistant device 100 may recognize the voice command of the receiver to terminate the call connection by blocking the call connection when the corresponding voice command is a command associated with the call termination.

Meanwhile, the communication company server 400 receives the call transmitting signal from the transmitting terminal 300.

Further, the communication company server 400 may be configured to include an additional service server or configured to interwork with the additional service server via the communication with the service server. The communication company server 400 checks the identification information of the digital assistant device 100 corresponding to the receiving number in response to the call transmitting signal according to the call transmitting signal received above in the identification information of the digital assistant device by a plurality of different receiving numbers pre-stored in the corresponding additional service server.

Here, the identification information of the digital assistant device 100 includes a mobile IP, a mobile MAC, a serial number, etc.

Further, the communication company server 400 generates a call processing request signal including the checked identification information of the digital assistant device 100 and the receiving number of the receiving terminal 500 in response to the call transmitting signal to transmit the generated call processing request signal to the service server 200.

At this time, the communication company server 400 may perform a call connection function between the transmitting terminal 300 and the receiving terminal 500 by attempting the call connection to the receiving terminal 500 without generating the call processing request signal, when the identification information of the digital assistant device pre-registered in association with the receiving number of the corresponding receiving terminal 500 is not checked as the checking result.

Further, as the checking result, when the identification information of the digital assistant device 100 pre-registered in association with the receiving number of the corresponding receiving terminal 500 is checked, the communication company server 400 performs a call connection function between the transmitting terminal 300 and the service server 200 in order to perform the call connection function via the corresponding service server 200.

Meanwhile, the service server 200 communicates with the digital assistant device 100, the transmitting terminal 300, the communication company server 400, the receiving terminal 500, etc.

Further, the service server 200 receives the call processing request signal including the receiving number transmitted from the communication company server 400, the identification information of the digital assistant device 100, etc.

Further, the service server 200 checks (identifies) the digital assistant device 100 associated with the identification information of the digital assistant device 100 included in the received call processing request signal and checks the receiving terminal 500 based on the receiving number included in the call processing request signal.

Further, the service server 200 attempts the call connection for the call connection between the digital assistant device 100 of the receiver and the transmitting terminal 300 with respect to the digital assistant device 100 based on the identification information of the digital assistant device 100 checked above in response to the call processing request signal while requesting (or transmitting) to the communication company server 400 the call connection (or the receiving call connection signal) between the receiving terminal 500 corresponding to the corresponding receiving number and the transmitting terminal 300 based on the receiving number checked above in response to the call processing request signal of the communication company server 400 above.

In addition, the service server 200 may form (or configure) a first call channel between the digital assistant device 100 and the transmitting terminal 300 via the communication company server 400 when receiving a response signal for a call connection attempt from the digital assistant device 100.

At this time, the service server 200 may generate a call connection request signal for the call connection between the digital assistant device 100 and the transmitting terminal 300 based on the corresponding response signal by receiving the response signal from the digital assistant device 100 to transmit the generated call connection request signal to the communication company server 400. When the communication company server 400 forms the first call channel via the service server 200 and the communication company server 400 between the digital assistant device 100 and the transmitting terminal 300 based on the call connection request signal, the communication company server 400 stops the call connection attempt to the receiving terminal 500 and forms a second call channel different from the first call channel between the transmitting terminal 300 and the receiving terminal 500 in parallel, wherein the corresponding second call channel may be formed in an idle state (or call waiting state) without transmitting and receiving the signal.

Further, the communication company server 400 may interlock the first call channel and the second call channel.

Further, when the call between the digital assistant device 100 and the transmitting terminal 300 is terminated through the first call channel formed between the digital assistant device 100 and the transmitting terminal 300 via the service server 200 and the communication company server 400, the corresponding first call channel (or call connection state) and the second call channel may be terminated (or released/canceled).

The transmitting terminal 300 and the receiving terminal 500 may be applied to various terminals, such as a smart phone, a portable terminal, a mobile terminal, a personal digital assistant (PDA), a portable multimedia player (PMP) terminal, a telematics terminal, a navigation terminal, a personal computer, a notebook computer, a slate PC, a tablet PC, a ultrabook, a wearable device (for example, including a smartwatch, a smart glass, a head mounted display (HMD), etc.), a Wibro terminal, an Internet protocol television (IPTV) terminal, a smart TV, a digital broadcasting terminal, a television, a 3D television, a home theater system, an audio video navigation (AVN) terminal, an audio/video (A/V) system, and a flexible terminal.

Figure 2:
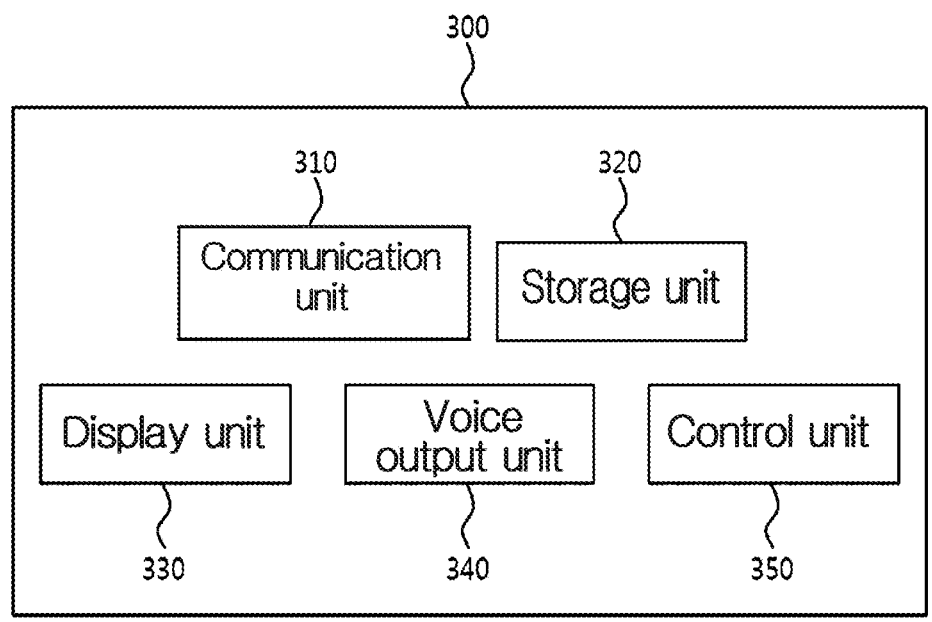
FIG. 2 is a block diagram illustrating a configuration of a transmitting terminal according to an embodiment of the present invention.

As illustrated in FIG. 2, the transmitting terminal 300 is configured by a communication unit 310, a storage unit 320, a display unit 330, a voice output unit 340, and a control unit 350. All components of the transmitting terminal 300 illustrated in FIG. 2 are not required components, but the transmitting terminal 300 may be implemented by more components than the components illustrated in FIG. 2 and may also be implemented by less components than the components illustrated in FIG. 2.

The communication unit 310 communicates with any internal component or at least one external terminal via a wired/wireless communication network. At this time, any external terminal may include the digital assistant device 100, the service server 200, the communication company server 400, the receiving terminal 500, etc. Here, the wireless Internet technology may include wireless LAN (WLAN), digital living network alliance (DLNA), wireless broadband (Wibro), World Interoperability for Microwave Access (Wimax), HSDPA (High Speed Downlink Packet Access), HSUPA (High Speed Uplink Packet Access), IEEE 802.16, long term evolution (LTE), long term evolution-advanced (LTE-A), wireless mobile broadband service (WMBS), 5G mobile communication service, Bluetooth, radio frequency identification (RFID), infrared data association (IrDA), UWB (Ultra Wideband), ZigBee, Near Field Communication (NFC), Ultra Sound Communication (USC), Visible Light Communication (VLC), Wi-Fi, Wi-Fi Direct, long range (LoRa), etc. The communication unit 310 transmits and receives data according to at least one wireless Internet technology in the range including the Internet technologies which are not listed above. In addition, the wired communication technology may include power line communication (PLC), USB communication, Ethernet, serial communication, optical/coaxial cables, etc.

In addition, the communication unit 310 may mutually transmit information with any terminal via a universal serial bus (USB).

Further, communication unit 310 transmits and receives radio signals with a base station, the digital assistant device 100, the service server 200, the communication company server 400, the receiving terminal 500, etc. on a mobile communication network constructed according to technical standards or communication schemes for mobile communication (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

The storage unit 320 (or a memory) stores various user interfaces (UIs), graphical user interfaces (GUIs), etc.

Further, the storage unit 320 stores data, programs, etc. required to operate the transmitting terminal 300.

That is, the storage unit 320 may store a plurality of application programs or applications driven in the transmitting terminal 300, data for operation, and commands. At least some of these application programs may be downloaded from an external service providing apparatus via wireless communication. In addition, at least some of these application programs may exist in the transmitting terminal 300 from the time of shipment for basic functions (e.g., a call receiving/transmitting function, a message transmitting/receiving function). On the other hand, the application programs may be stored in the storage unit 320 and installed in the transmitting terminal 300 to be driven to perform an operation (or function) by the control unit 350.

Further, the storage unit 320 may include at least one storage medium of a flash memory type, a hard disk type, a multimedia card micro type, a card type memory (e.g., SD or XD memory, etc), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the transmitting terminal 300 may operate a web storage performing a storage function of the storage unit 320 on the Internet or operate in association with the web storage.

The display unit 330 may display various contents such as various menu screens by using a user interface and/or a graphic user interface stored in the storage unit 320 by the control of the control unit 350. Here, the contents displayed on the display unit 330 include various texts or image data (including various types of information data), menu screens including data of icons, list menus, combo boxes, and the like, etc. Further, the display unit 330 may be a touch screen.

Further, the display unit 330 may include at least one of a liquid crystal display (LCD), a thin film transistor-liquid crystal display (TFT LCD), an organic light-emitting diode (OLED), a flexible display, a 3D display, an e-ink display, and a light emitting diode (LED).

In addition, the display unit 330 may be configured as a stereoscopic display unit displaying stereoscopic images.

A 3D display method such as a stereoscopic method (glasses method), an auto stereoscopic method (glasses-free method), or a projection method (holographic method) may be applied to the stereoscopic display unit.

The voice output unit 340 outputs voice information included in a predetermined signal processed by the control unit 350. Here, the voice output unit 340 may include a receiver, a speaker, a buzzer, and the like.

Further, the voice output unit 340 outputs a guidance voice generated by the control unit 350.

The control unit 350 executes an overall control function of the transmitting terminal 300. In this case, the control unit 350 may be a processor or an engine.

In addition, the control unit 350 performs an overall control function using programs and data stored in the storage unit 320. The control unit 350 may include a RAM, a ROM, a CPU, a GPU, and a bus, and the RAM, the ROM, the CPU, and the GPU may be connected to each other via a bus. The CPU accesses the storage unit 320 to perform booting using an O/S stored in the storage unit 320 and perform various operations using various programs, contents, and data stored in the storage unit 320.

In addition, the control unit 350 may generate and transmit a call transmitting signal including the receiving number through the communication unit 310 as the receiving number of the receiver according to the user's selection based on a phone book stored in the storage unit 320.

Through this, the control unit 350 may check the digital assistant device 100 and the receiving terminal 500 based on receiver information corresponding to the receiving number in the communication company server 400 on the basis of the call transmitting signal transmitted in the communication unit 310 and perform the call connection between the checked digital assistant device 100 and the transmitting terminal 300 and between the checked receiving terminal 500 and the transmitting terminal 300.

Further, when the first call channel among the digital assistant device 100, the service server 200, the communication company server 400 and the transmitting terminal 300 is formed by the mediation (or relay) of the communication company server 400, the communication unit 310 forms another second call channel among the transmitting terminal 300, the communication company server 400, and the receiving terminal 500 in parallel with the first call channel above by the mediation of the communication company server 400.

At this time, the another second call channel between the transmitting terminal 300 and the receiving terminal 500 may be a state formed to pay for the cost according to the call between the digital assistant device 100 and the transmitting terminal 300, and when the corresponding call between the digital assistant device 100 and the transmitting terminal 300 is terminated, the another second call channel is terminated and the cost settlement according to the corresponding call between the digital assistant device 100 and the receiving terminal 500 may be performed by the communication company server 400.

Here, the communication company server 400 may stop the call connection attempt to the receiving terminal 500 when forming the first call channel by the response signal of the digital assistant device 100, form the second call channel between the transmitting terminal 300 and the receiving terminal 500, and then maintain the second call channel in an idle state which is a simple occupied state without transmitting/receiving the signal until the call of the first call channel is terminated.

Through this, the transmitting terminal 300 may perform an actual voice call function with the digital assistant device 100 and maintain the second call channel which is the corresponding different communication channel in a background state with the receiving terminal 500 while the performance of the call function with the digital assistant device 100 is maintained.

Meanwhile, the communication company server 400 communicates with the service server 200, the transmitting terminal 300, the receiving terminal 500, etc.

Further, the communication company server 400 may include configurations for the communication unit 310, the storage unit 320, the display unit 330, the voice output unit 340, and the control unit 350, which are included in the transmitting terminal 300.

Further, the communication company server 400 receives the call transmitting signal transmitted from the transmitting terminal 300.

That is, the communication company server 400 receives the call transmitting signal including the receiving number and the like of the receiving terminal 500 transmitted from the transmitting terminal 300.

In addition, the communication company server 400 checks the receiver information based on the received transmitting signal.

The communication company server 400 checks identification information of the digital assistant device 100 corresponding to the receiving number in identification information of digital assistant devices by a plurality of different receiving numbers pre-stored based on the receiving number included in the call transmitting signal received from the transmitting number of the transmitting terminal 300.

To this end, the communication company server 400 stores (or manages) the receiver information associated with the receiving terminal 500 subscribed as a member in order to use the additional service supporting the call using the digital assistant device 100 in the corresponding communication company server 400.

At this time, the identification information of the digital assistant device 100 corresponding to the receiver is included in the receiver information while matched with the identification information of the receiving terminal 500 corresponding to the receiver to be stored in the communication company server 400.

Here, the receiver information of the receiver who has not subscribed to the additional service may be stored without the identification information of the digital assistant device 100.

Here, the identification information of the receiving terminal 500 may include a plurality of different attribute parameters for a receiving number (or a phone number or a mobile directory number (MDN)), a mobile IP, a mobile MAC, subscriber identity module (Sim) card unique information, a serial number, etc.

In the aforementioned configuration, the communication company server 400 may be configured to include a separate additional service server for checking subscription (checking registration) of the additional service supporting the call using the digital assistant device 100 or the corresponding additional service server may be configured to be separated from the communication company server 400 to interworking via mutual communication with the communication company server 400 and store the corresponding receiver information.

That is, in the additional service server, the identification information of the digital assistant device 100 may be pre-stored to correspond to (be matched with) the receiving number of the receiving terminal 500, and the identification information of the digital assistant device for each receiving number corresponding to each of a plurality of different receivers may be pre-stored in the additional service server.

Accordingly, the communication company server 400 may check the receiver information for each of the plurality of different receivers by interworking with the additional service server based on the receiving number according to the corresponding call transmitting signal when receiving the call transmitting signal from the transmitting terminal 300 to check the receiving terminal 500 and the digital assistant device 100 of a specific receiver based on the receiver information of the specific receiver retrieved in response to the receiving number according to the call transmitting signal. In addition, the communication company server 400 may transmit to the service server 200 a call processing request signal including the identification information of the digital assistant device 100 associated with the receiving number and the receiver information for requesting the call connection attempt to the digital assistant device 100 and the receiving terminal 500 checked in response to the call transmitting signal.

Further, when the communication company server 400 receives a receiving call connection signal associated with the call connection attempt to the receiving terminal 500 of the service server 200 in response to the corresponding call processing request signal, the communication company server 400 may transmit a receiving call to the receiving terminal 500 matched with the digital assistant device 100 according to the receiver information in response to the receiving call connection signal to mediate the call connection attempt of the service server 200 to the receiving terminal 500.

Further, when the communication company server 400 receives the response signal or the call connection request signal of the digital assistant device 100 from the corresponding service server 200 receiving the response signal in response to the call connection attempt to the digital assistant device 100 which is performed simultaneously with the call connection attempt to the receiving terminal 500 by the service server 200, the communication company server 400 may form a first call channel between the digital assistant device 100 and the transmitting terminal 300 via the service server 200 and the communication company server 400, stop the call connection attempt to the receiving terminal 500 while forming the first call channel, form a second call channel linked to the first call channel automatically, and maintain the second call channel in an idle state.

Further, the communication company server 400 may terminate the second call channel together when the call connection to the first call channel is terminated via the communication with the service server 200.

Meanwhile, in the above-described configuration, one receiving number may be matched and identification information for each of the plurality of different receiving terminals may be registered in the receiver information of the specific receiver, and the identification information for each of the plurality of different receiving terminals corresponding to the specific receiver may be included in the receiver information of the specific receiver while matched with the identification information of the digital assistant device 100 corresponding to the specific receiver.

At this time, when the identification information for each of the plurality of different receiving terminals 500 corresponding to the specific receiver is included in the receiver information, the identification information for each of the plurality of receiving terminals corresponding to the plurality of different receiving terminals 500 one by one may be the same as each other in only the receiving number (phone number) and different from each other in parameters of other attributes.

Through this, the communication company server 400 may check the receiver information corresponding to the receiving number according to the call transmitting signal of the transmitting terminal 300 when the transmitting terminal 300 attempts the call to the receiving number (phone number) corresponding to the specific receiver and generate a call processing request signal including the identification information for each of the plurality of different receiving terminals 500 when the plurality of different receiving terminals 500 other than the digital assistant device 100 is registered in the receiver information to transmit the generated call processing request signal to the service server 200.

Accordingly, the service server 200 may attempt a call connection in parallel with the digital assistant device 100 for each of the plurality of different receiving terminals 500 through the communication company server 400.

Further, when the digital assistant device 100 responds to the call connection attempted in parallel with respect to the digital assistant device 100 and each of the plurality of different receiving terminals 500 in response to one receiving number via the communication with the service server 200, as described above, the communication company server 400 may form a call channel in an idle state separately for each of the plurality of different receiving terminals 500 corresponding to the specific receiver other than the first call channel for the call connection between the digital assistant device 100 of the specific receiver and the transmitting terminal 300.

Further, when the call connection between the digital assistant device 100 and the transmitting terminal 300 is terminated via the communication with the service server 200, the communication company server 400 may terminate all the call channels formed for each of the plurality of receiving terminals 500.

Meanwhile, the service server 200 performs a call connection function between the digital assistant device 100 and the communication company server 400 based on the receiving call connection (or the receiving call connection request) with the digital assistant device 100 requested from the communication company server 400 in response to the call processing request signal transmitted above.

As such, when the call connection between the digital assistant device 100 and the communication company server 400 is normally performed by the service server 200, the first call channel among the digital assistant device 100, the service server 200, the communication company server 400 and the transmitting terminal 300 may be normally connected.

At this time, while the call between the digital assistant device 100 and the transmitting terminal 300 is connected via the service server 200 and the communication company server 400, the service server 200 (or the communication company server 400) may be configured to maintain a state in which the call between the transmitting terminal 300 and the receiving terminal 500 is connected via the communication company server 400 in parallel.

Meanwhile, when the digital assistant device 100 may recognize a voice command of the user during the call connection with the transmitting terminal 300 according to the connection of the first call channel and generate a recording request signal when the corresponding voice command is a recording request to the call contents to transmit the generated recording request signal to the service server 200.

At this time, the digital assistant device 100 may also transmit the corresponding recording request signal to the service server 200 through a separate communication network or channel from the first call channel.

Accordingly, the service server 200 may record the voice signal transmitted/received through the first call channel call-connected in response to the digital assistant device 100 transmitting the corresponding recording request signal when receiving the recording request signal from the digital assistant device 100 and generate and store recording information according to the record of the corresponding voice signal.

In this case, when a video call is performed between the digital assistant device 100 and the transmitting terminal 300 through the first call channel, the service server 200 may record a video and a voice to store the generated video information as the recording information.

In addition, the service server 200 may match and store the recording information with at least one of the identification information of the digital assistant device 100 and the phone number of the receiving terminal 500 included in the recording request signal.

Further, the service server 200 may transmit to the receiving terminal 500 the recording information checked in response to request information when receiving the request information on the providing of the recording information including at least one of the identification information of the digital assistant device 100 and the phone number of the receiving terminal 500 from the receiving terminal 500.

In this case, the service server 200 may transmit the corresponding recording information to the transmitting terminal 300 even when receiving a request for providing the recording information from the transmitting terminal 300.

Through the above-described configuration, when the receiving terminal 500 and/or the digital assistant device 100 does not support a recording function, the service server 200 may record the call contents, thereby increasing the user's convenience.

Figure 3:
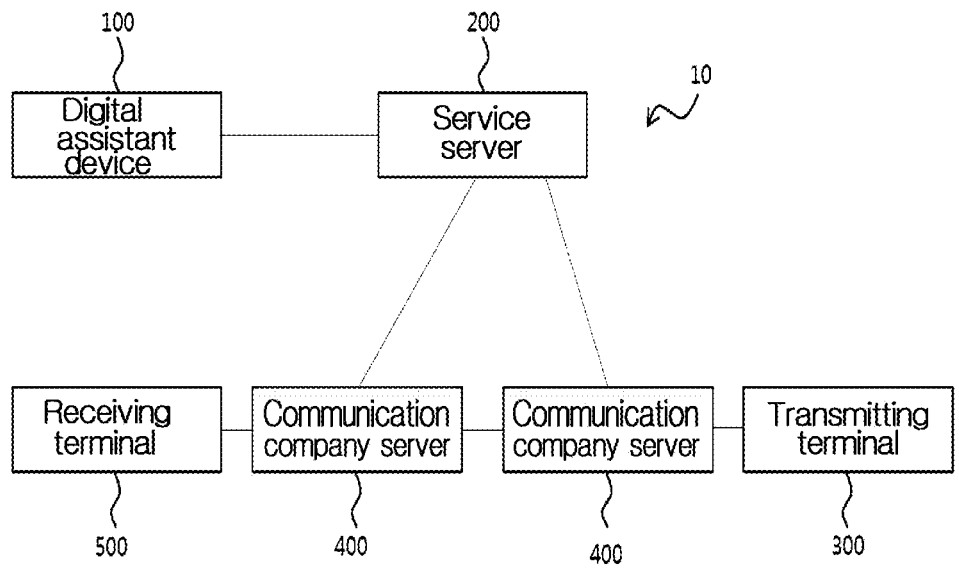
FIG. 3 is a block diagram illustrating a configuration of another service system supporting a voice call using a digital assistant device according to an embodiment of the present invention.

Meanwhile, as illustrated in FIG. 3, while the transmitting terminal 300 and the receiving terminal 500 are subscribed to different communication companies, a plurality of different communication company servers 400 is configured between the transmitting terminal 300 and the receiving terminal 500, respectively, and the call connection among the transmitting terminal 300, the plurality of different communication company servers 400, and the receiving terminal 500 may also be maintained by mutual interworking (or mutual communication connection) of the plurality of different communication company servers 400.

Further, when the call connection between the digital assistant device 100 and the receiving terminal 500 is terminated, the communication company server 400 terminates connections of a call channel among the digital assistant device 100, the service server 200, the communication company server 400, and the transmitting terminal 300 and a call channel among the transmitting terminal 300, the communication company server 400, and the receiving terminal 500, respectively.

That is, when the call connection between the digital assistant device 100 and the transmitting terminal 300 is terminated, the communication company server 400 terminates the call connection among the digital assistant device 100, the service server 200, the communication company server 400, and the transmitting terminal 300 and terminates the call connection among the transmitting terminal 300, the communication company server 400, and the receiving terminal 500 after the corresponding call connection is terminated.

In addition, after the entire call connection is terminated, the communication company server 400 charges the call fee associated with the corresponding call connection to the corresponding transmitting terminal 300 and/or the receiving terminal 500.

Meanwhile, the receiving terminal 500 communicates with the digital assistant device 100, the service server 200, the transmitting terminal 300, the communication company server 400, etc.

Further, the receiving terminal 500 may include configurations for the communication unit 310, the storage unit 320, the display unit 330, the voice output unit 340, and the control unit 350 included in the transmitting terminal 300.

Accordingly, the control unit configured in the receiving terminal 500 may communicate with the communication company server 400 by the communication unit to transmit registration information including the identification information of the digital assistant device 100 used by the receiver of the receiving terminal 500 in the receiver information corresponding to the receiving terminal 500 pre-registered in the communication company server 400.

Accordingly, the communication company server 400 receiving the registration information from the receiving terminal 500 may update and store the receiver information by including the identification information of the digital assistant device 100 matched with the receiving number in the receiver information pre-registered and pre-stored.

At this time, the communication company server 400 may include and update the identification information of the digital assistant device 100 in the receiver information based on the corresponding registration information by interworking with the additional service server.

Further, the receiving terminal 500 forms a second call channel with the transmitting terminal 300 by the mediation of the communication company server 400.

At this time, before the first call channel is formed between the digital assistant device 100 and the transmitting terminal 300 by the mediation of the communication company server 400, the receiving terminal 500 may be configured to output transmitter information of the transmitting terminal 300 transmitted from the communication company server 400 (or the service server 200) so that the receiver of the corresponding receiving terminal 500 checks the transmitter information requesting the call connection.

Further, when the call between the transmitting terminal 300 and the digital assistant device 100 is terminated, the receiving terminal 500 terminates the call with the transmitting terminal 300 by the control of the communication company server 400.

In the embodiment of the present invention, during the call connection between the digital assistant device 100 and the transmitting terminal 300, the voice call has been described as an example, but is not limited thereto. In addition of the voice call, when a display unit (not illustrated) is provided in the digital assistant device 100, a video call (or image call) may also be performed between the digital assistant device 100 and the transmitting terminal 300.

In addition, in addition to the voice call and/or the video call, an email sending function between the digital assistant device 100 and an email server (not illustrated), a post/comment registration function in a social network account associated with the corresponding transmitting terminal 300 between the digital assistant device 100 and a social network server (not illustrated), etc. may be performed.

Further, the transmitting terminal 300 and/or the receiving terminal 500 may further include an interface unit (not illustrated) serving as an interface with all external devices connected to the corresponding transmitting terminal 300 and/or the receiving terminal 500. For example, the interface unit may configured by a wireless/wired headset port, an external charger port, a wired/wireless data port, a memory card port, a port connecting a device with an identification module, an audio input/output (I/O) port, a video input/output (I/O) port, an earphone port, and the like. Here, the identification module as a chip for storing various information for authenticating use authority of the transmitting terminal 300 and/or the receiving terminal 500 may include a user identification module (UIM), a subscriber identity module (SIM), a universal subscriber identity module (USIM), and the like. In addition, the device provided with the identification module may be manufactured in the form of a smart card. Accordingly, the identification module may be connected to the transmitting terminal 300 and/or the receiving terminal 500 through a port. Such an interface unit receives data from an external device or receives power to transmit the received data or power to each component inside the transmitting terminal 300 and/or the receiving terminal 500 or to transmit the data in the transmitting terminal 300 and/or the receiving terminal 500 to the external device.

In addition, when the transmitting terminal 300 and/or the receiving terminal 500 is connected with an external cradle, the interface unit may be a passage through which power from the cradle is supplied to the transmitting terminal 300 and/or the receiving terminal 500 or a passage through which various command signals input from the cradle by the user are transmitted to the transmitting terminal 300 and/or the receiving terminal 500. The various command signals input from the cradle or the corresponding power may also be operated as signals for recognizing that the transmitting terminal 300 and/or the receiving terminal 500 is correctly mounted on the cradle.

In addition, the transmitting terminal 300 and/or the receiving terminal 500 may further include an input unit (not illustrated) which receives a signal according to a button operation or a selection of any function by a user or receives a command or control signal generated by an operation such as touching/scrolling a screen to be displayed.

The input unit is a means for receiving at least one of commands, selection, data, and information of the user, and may include a plurality of input keys and function keys for receiving numeric or character information and setting various functions.

In addition, as the input unit, various devices such as a key pad, a dome switch, a touch pad (static pressure/electrostatic), a touch screen, a jog wheel, a jog switch, a jog shuttle, and a mouse, a stylus pen, and a touch pen may be used. Particularly, when the display unit 330 is formed in the form of a touch screen, some or all of the input functions may be performed by the display unit 330.

In addition, each component (or module) of the transmitting terminal 300 may be software stored on a memory (or storage unit) of the transmitting terminal 300 and/or the receiving terminal 500. The memory may be an internal memory of the transmitting terminal 300 and/or the receiving terminal 500, and may be an external memory or other types of storage devices. Further, the memory may be a non-volatile memory. The software stored on the memory may include a command set to perform a specific operation by the transmitting terminal 300 and/or the receiving terminal 500 when executing.

In addition, the service server 200 and the communication company server 400 may be implemented in the form of a web server, a database server, a proxy server, or the like. In addition, in the service server 200 and the communication company server 400, a network load distribution mechanism to one or more of a variety of software may be installed so that the service server 200 and the communication company server 400 may operate on the Internet or another network to be implemented by a computerized system. Further, the network may be an http network, and may be a private line, intranet, or any other network. Furthermore, the service server 200, the communication company server 400, and the transmitting terminal 300 and/or the receiving terminal 500 may be connected via a secure network so as to prevent the data from being attacked by any hacker or other third parties. In addition, the service server 200 and the communication company server 400 may include a plurality of database servers, and the database server may be implemented to be separately connected with the service server 200 and the communication company server 400 through any type of network connection including a distributed database server architecture.

In addition, a processor mounted in the digital assistant device 100, the service server 200, the transmitting terminal 300, the communication company server 400, and the receiving terminal 500 according to the present invention may process program commands for executing the method according to the present invention. In one embodiment, this processor may be a single-threaded processor, and in another embodiment, the processor may be a multi-threaded processor. Furthermore, the processor can process commands stored in a memory or storage device.

As such, when the call is connected between the digital assistant device 100 and the transmitting terminal 300 by the overall control of the service server 200, the receiving terminal 500 is used, but the actual call is made without the receiving terminal 500, and may perform the call between the digital assistant device 100 and the transmitting terminal 300 through the voice command of the receiver.

Further, as such, when the call is connected between the digital assistant device 100 and the transmitting terminal 300 by the overall control of the service server 200, the call connection between the transmitting terminal 300 and the receiving terminal 500 is maintained in parallel and the service server 200 and/or the communication company server 400 may provide a receiving alarm to the receiving terminal 500 by using the phone number of the transmitting terminal 300 as a transmitting number.

Hereinafter, a service method supporting a voice call using the digital assistant device according to the present invention will be described in detail through FIGS. 4 and 5 with reference to FIGS. 1 to 3.

Figure 4:
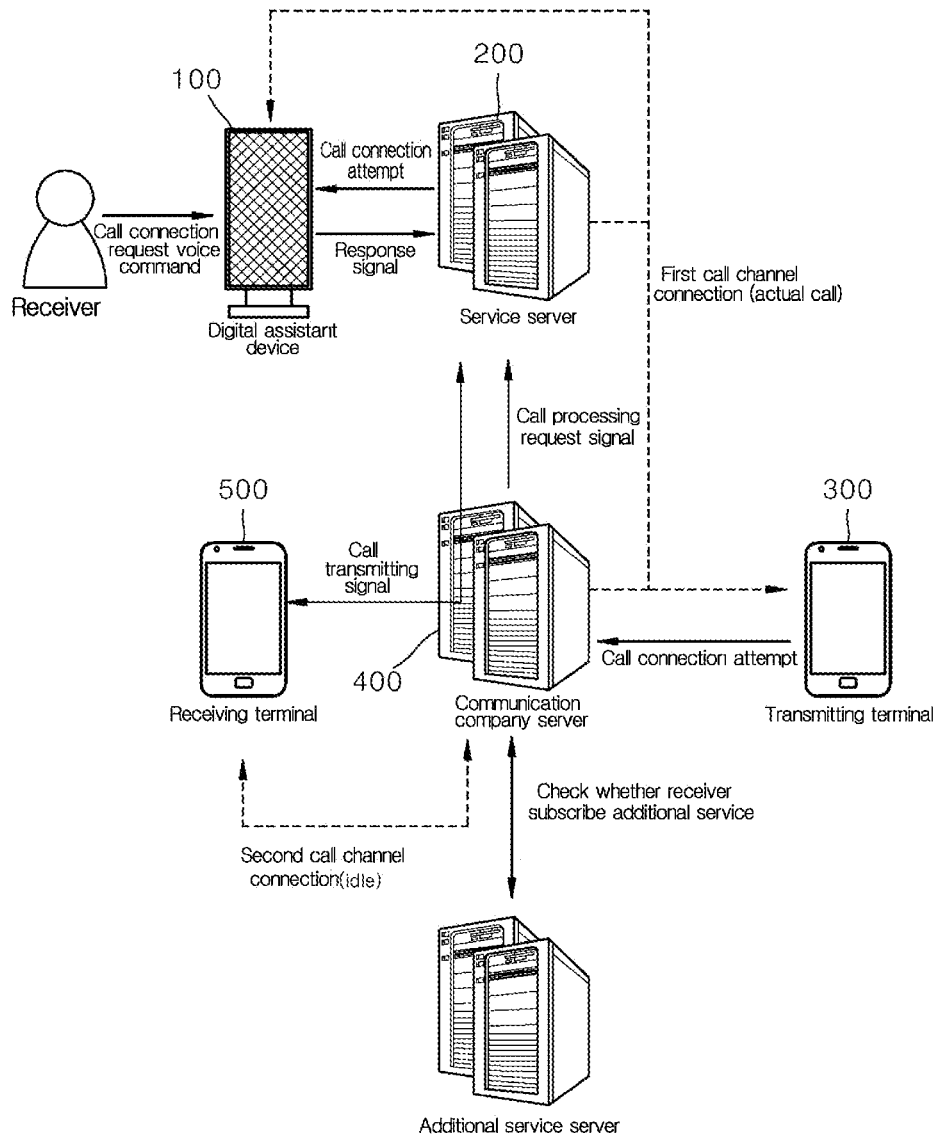
FIG. 4 is an operational exemplary diagram illustrating a service system supporting a voice call using a digital assistant device according to an embodiment of the present invention.
Figure 5:
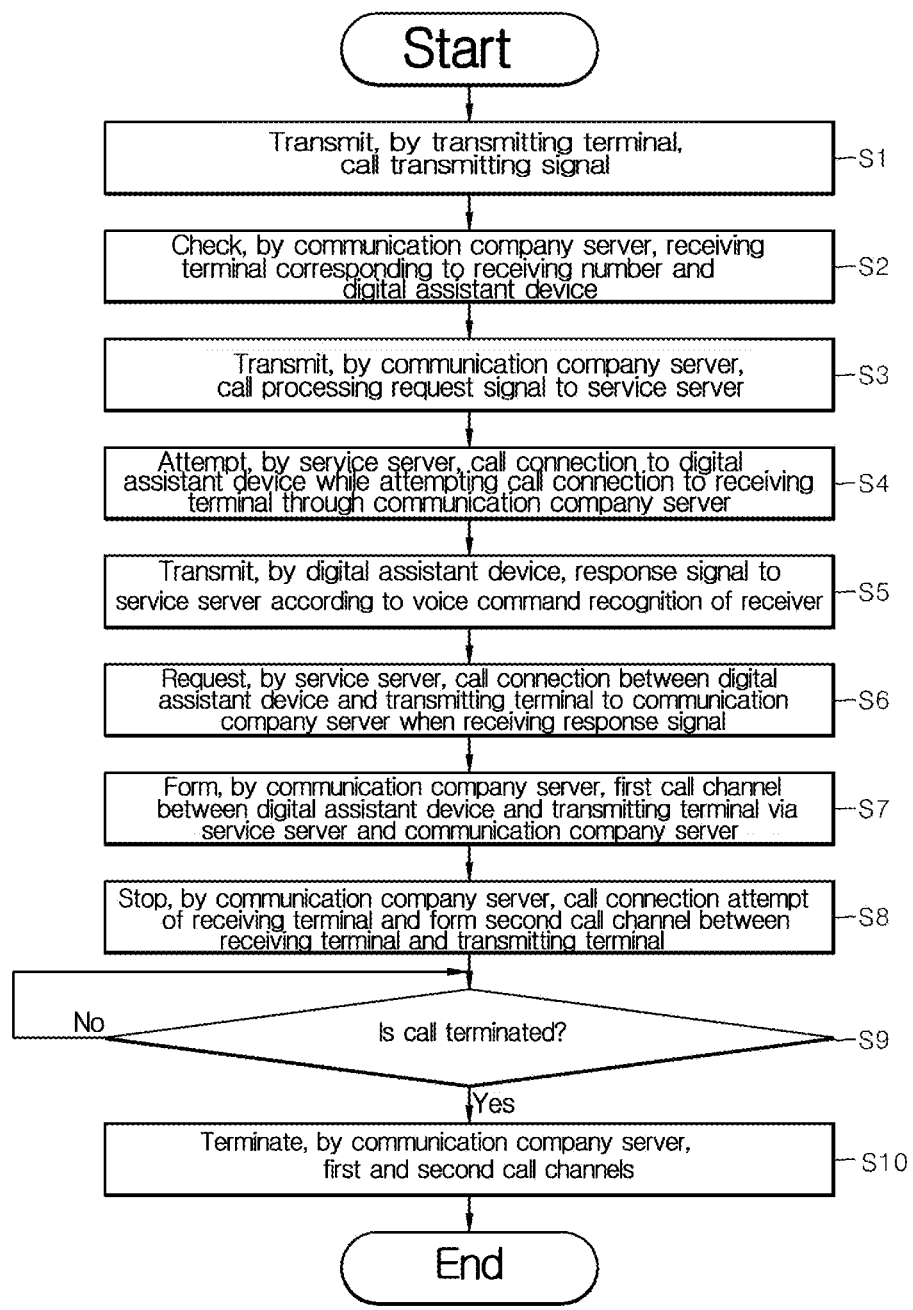
FIG. 5 is a flowchart illustrating a service method supporting a voice call using a digital assistant device according to an embodiment of the present invention.

FIG. 4 is an operational exemplary diagram illustrating a service system 10 supporting a voice call using the digital assistant device 100 according to the embodiment of the present invention and FIG. 5 is a flowchart illustrating a service method supporting a voice call using the digital assistant device 100 according to the embodiment of the present invention.

First, the transmitting terminal 300 may generate a call transmitting signal including a receiving number of the receiving terminal 500 selected by the user to transmit the generated call transmitting signal to the communication company server 400 (S1).

In addition, the communication company server 400 may directly check or check in conjunction with the additional service server whether there is receiver information subscribed (registered) in an additional service supporting the call using the digital assistant device 100 in response to the corresponding receiving number based on the receiving number of the receiving terminal 500 included in the call transmitting signal when receiving the call transmitting signal from the transmitting terminal 300 (S2).

Further, the communication company server 400 may generate a call processing request signal including the receiving number of the receiving terminal 500 included in the receiver information, the identification information of the digital assistant device 100, the transmitting number of the transmitting terminal 300, and the like when there is the receiver information in response to the receiving number according to the call transmitting signal and then transmit the generated call processing request signal to the service server 200 (S3).

Here, the identification information of the digital assistant device 100 includes a mobile IP, a mobile MAC, a serial number, etc.

In addition, when receiving the call processing request signal received from the communication company server 400, the service server 200 may determine the use of the additional service, and check the receiving number of the receiving terminal 500 included in the call processing request signal and the identification information of the digital assistant device 100.

Further, the service server 200 may attempt a call connection to the receiving terminal 500 checked in response to the call processing request signal by the communication company server 400 while attempting the call connection to the digital assistant device 100 corresponding to the identification information of the digital assistant device 100 according to the call processing request signal (S4).

In one example, the service server 200 requests (or transmits) to the communication company server 400 a receiving call connection (or a receiving call connection signal) with the receiving terminal 500 corresponding to the corresponding receiving number based on the receiving number checked above in response to the call processing request signal of the communication company server 400 above and transmits a receiving call to the receiving terminal 500 in response to the receiving call connection.

Meanwhile, the digital assistant device 100 may output a receiving alarm sound, receiving alarm information, etc. according to the receiving call received from the service server depending on the call connection attempt of the service server 200.

To this end, the digital assistant device 100 may be configured to include an output unit for outputting to the receiver an alarm sound, receiving alarm information, or the like for the reception of the receiving call when receiving the receiving call. At this time, the output unit may include a display means and the like such as a speaker and a display.

Further, the digital assistant device 100 receives a voice by the receiver (or the user) and performs a voice recognition function for the received voice.

At this time, the digital assistant device 100 checks whether the received voice is the voice of a pre-registered user (or user authentication) and may also perform the voice recognition function for the corresponding received voice when the received voice corresponds to the voice of the pre-registered user.

In addition, the digital assistant device 100 determines whether a voice command for the call connection is included in a result of performing the voice recognition function.

As the determining result, when the voice command for the call connection is included in the corresponding result of performing the voice recognition function, the digital assistant device 100 generates a response signal in response to the receiving call received from the service server 200 according to the call connection attempt of the service server 200 to transmit the generated response signal to the service server 200 (S5).

At this time, as the determining result, when the voice command for performing other control functions associated with the digital assistant device 100 is included in the corresponding result of performing the voice recognition function, the digital assistant device 100 performs other control functions associated with the digital assistant device 100 corresponding to the corresponding voice command.

As an example of this, the digital assistant device 100 receives a voice (e.g., "Ari, pick up the phone") through the receiver, and performs a voice recognition function for the received voice.

In addition, the digital assistant device 100 determines whether the voice command for the call connection is included in the result of performing the voice recognition function, and as the determining result, when it is determined that the voice command (e.g., "pick up the phone") for the call connection for the call with the transmitting terminal 300 is included in the result of performing the voice recognition function, the digital assistant device 100 generates a response signal in response to the receiving call to transmit the generated response signal to the service server 200.

Thereafter, the service server 200 may transmit the corresponding response signal to the communication company server 400 when receiving the response signal transmitted from the digital assistant device 100 or generate a call connection request signal for requesting the call connection between the digital assistant device 100 and the transmitting terminal 300 in response to the corresponding response signal to transmit the generated call connection request signal to the communication company server 400 (S6).

Here, when the communication company server 400 performs the call connection function with the corresponding receiving terminal 500 based on the receiving call connection with the receiving terminal 500 requested from the service server 200, the communication company server 400 (or the service server 200) may provide transmitter information (e.g., including a phone number, etc. of the transmitting terminal 300) associated with the transmitting terminal 300 based on the transmitting number checked when generating the call processing request signal and the receiving terminal 500 may also check transmitter information corresponding to the transmitting number before the call connection.

Further, the communication company server 400 may determine that the call connection between the digital assistant device 100 and the transmitting terminal 300 is performed when receiving the response signal or the call connection request signal from the service server 200 other than the receiving terminal 500 in response to the call processing request signal and form a first call channel for the call connection between the digital assistant device 100 and the transmitting terminal 300 via the communication with the service server 200 (S7).

Further, while the call between the digital assistant device 100 and the transmitting terminal 300 is connected via the service server 200 and the communication company server 400, the service server 200 (or the communication company server 400) may form a second call channel to maintain a state in which the call between the transmitting terminal 300 and the receiving terminal 500 is connected via the communication company server 400 in parallel (S8).

At this time, the communication company server 400 may maintain (form) an idle state with respect to the second call channel.

Thereafter, when the call connection between the digital assistant device 100 and the transmitting terminal 300 is terminated (S9), the communication company server 400 terminates (or releases) connections (or call connections) of the first call channel among the digital assistant device 100, the service server 200, the communication company server 400, and the transmitting terminal 300 which are connected in parallel and the second call channel among the transmitting terminal 300, the communication company server 400, and the receiving terminal 500, respectively (S10).

That is, when the call connection between the digital assistant device 100 and the transmitting terminal 300 is terminated, the communication company server 400 terminates the call connection among the digital assistant device 100, the service server 200, the communication company servers 400, and the transmitting terminal 300 and terminates the call connection among the transmitting terminal 300, the communication company servers 400, and the receiving terminal 500 after the corresponding call connection is terminated.

In addition, after the entire call connection is terminated, the communication company server 400 charges the call fee associated with the corresponding call connection to the corresponding transmitting terminal 300 and/or the receiving terminal 500.

As such, the actual call is performed between the digital assistant device 100 and the transmitting terminal 300, but as the transmitting terminal 300 associated with the digital assistant device 100 maintains the communication state with the corresponding receiving terminal 500, the communication company server 400 may perform a fee charging function (or a call fee settlement function according to the call between the digital assistant device 100 and the transmitting terminal 300) according to the call between the digital assistant device 100 and the transmitting terminal 300 through the corresponding receiving terminal 500.

According to the embodiment of the present invention, as described above, the receiver may freely perform a call with the transmitting terminal by the digital assistant device while the operation or control of the receiving terminal is unnecessary by using the receiving terminal, but preventing an actual call through the receiving terminal and performing a call between the digital assistant device and the transmitting terminal through a voice command of the receiver, when connecting the call between the digital assistant device and the transmitting terminal by an overall control of the service server, thereby increasing convenience in use.

Further, according to the embodiment of the present invention, as described above, since the call contents between the receiver and the transmitter are recorded by the service server connecting the call between the digital assistant device and the transmitting terminal instead of the receiving terminal and the recording information on the generated call contents may be provided to the receiving terminal, even though the receiving terminal or the digital assistant device does not support the recording function, the service server provides a recording function, thereby increasing user's convenience to the recording.

EXAMPLE 2

In addition to the aforementioned configuration, according to the present invention, when attempting the call connection between the user terminal and the opponent terminal according to the call transmission to the other of any one of the opponent terminal corresponding to the other user (used for a call with the user by the other user) which is a call opponent of the user and the user terminal of the user, the call connection between the digital assistant device of the user and the opponent terminal may support to be made through the voice command of the user instead of the user terminal and the conversion of the calling means may be supported when the user changes the calling means to the user terminal during the call connection between the digital assistant device and the opponent terminal.

Before the description of the conversion configuration of the calling means, a call connection process between the digital assistant device of the user and the opponent terminal required for the call conversion will be described with reference to the accompanying drawings.

Figure 6:
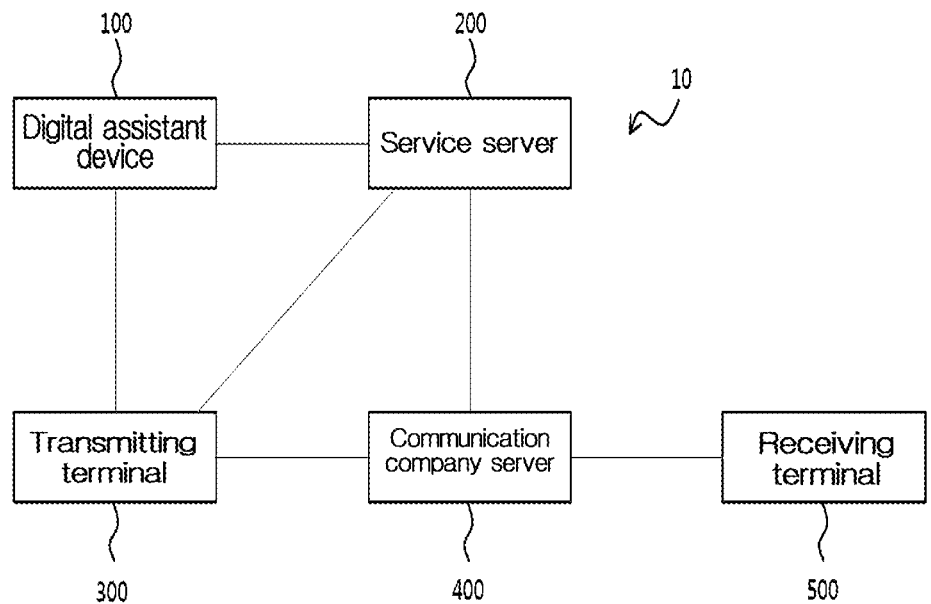
FIG. 6 is a block diagram illustrating a configuration of a service system supporting a call conversion between a digital assistant device and a terminal according to another embodiment of the present invention.
Figure 7:
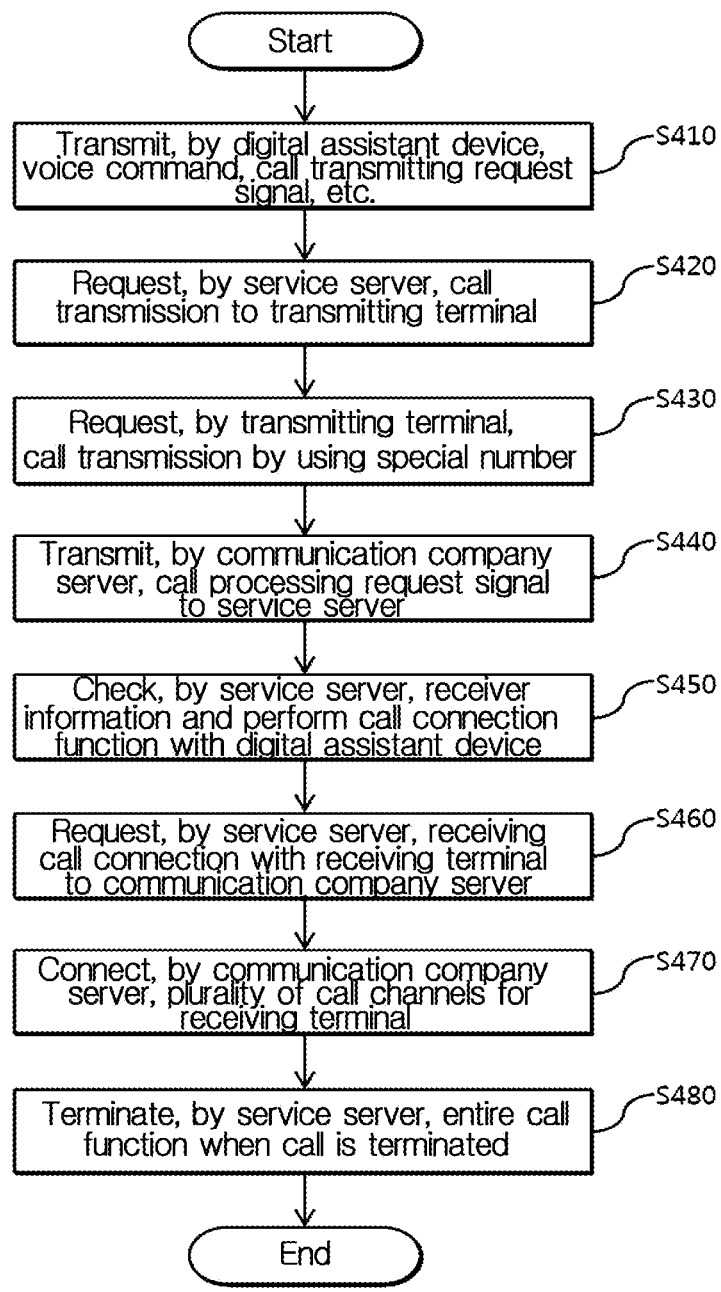
FIG. 7 is a flowchart illustrating a service method of the service system supporting the call conversion between the digital assistant device and the terminal according to the configuration of FIG. 6.

First, FIG. 6 is a block diagram illustrating a configuration associated with supporting a call with an opponent terminal using a digital assistant device of a service system 10 supporting a call conversion between the digital assistant device of a user and a terminal when the user is a transmitter, a call opponent of the user is a receiver, and the user terminal is a transmitting terminal, and the opponent terminal is a receiving terminal, and FIG. 7 is a flowchart illustrating a service method associated with supporting the call with the opponent terminal using the digital assistant device according to the configuration of FIG. 6.

When a voice command of the transmitter received from the digital assistant device 100 is a voice command for call connection, the digital assistant device 100 transmits a voice command, identification information of the digital assistant device 100, a call transmitting request signal, etc. to the service server 200 (S410). Subsequently, the service server 200 checks the transmitting terminal 300 corresponding to the identification information of the digital assistant device 100 and requests a call transmission to the checked transmitting terminal 300 (S420). Thereafter, the transmitting terminal 300 requests a call transmission to the communication company server 400 using a predetermined special number (S430). Thereafter, the communication company server 400 checks transmitter information corresponding to the transmitting terminal 300 and transmits a call processing request signal to the service server 200 to check a phone number of the receiving terminal 500 (S440). Then, the service server 200 checks the digital assistant device 100 corresponding to the call processing request signal, checks receiver information about the receiving terminal 500 based on the voice command received above from the corresponding digital assistant device 100, and performs a call connection function between the service server 200 and the digital assistant device 100 (S450). In addition, the service server 200 requests a receiving call connection with the receiving terminal 500 corresponding to the receiver information checked above in response to the call processing request signal to the communication company server 400 (S460). Thereafter, the communication company server 400 connects a first call channel which is a call channel (or communication channel) among the digital assistant device 100, the service server 200, the communication company server 400, and the receiving terminal 500 based on the receiving call connection with the receiving terminal 500 requested from the service server 200 and connects a second call channel which is a call channel among the transmitting terminal 300, the communication company server 400, and the receiving terminal 500 independently and in parallel for charging (S470).

In addition, when the call between the digital assistant device 100 and the receiving terminal 500 is terminated, both the first and second call channels are terminated (released) (S480).

Further, the digital assistant device 100 communicates with the service server 200, a predetermined transmitting terminal 300, etc. by a wired/wireless communication scheme. Here, the transmitting terminal 300 may log in to the digital assistant device 100 in advance to register information (or transmitter information) associated with the transmitting terminal 300 in the digital assistant device 100.

In addition, when the voice command (or voice) of the transmitter received from the digital assistant device 100 is a voice command for a call connection for the call with the receiving terminal 500, the digital assistant device 100 transmits the corresponding voice command, the identification information of the digital assistant device 100, the call transmitting request signal, etc. to the service server 200. Here, the identification information of the digital assistant device 100 includes a mobile IP, a mobile MAC, a serial number, etc.

That is, the digital assistant device 100 receives a voice by the transmitter (or the user) and performs a voice recognition function for the received voice. At this time, the digital assistant device 100 checks whether the received voice is the voice of a pre-registered user (or user authentication) and may also perform the voice recognition function for the corresponding received voice when the received voice corresponds to the voice of the pre-registered user. Here, the voice recognition function may be performed using various known technologies.

In addition, the digital assistant device 100 determines whether a voice command for the call connection is included in the result of performing the voice recognition function.

In addition, as the determining result, when the voice command for the call connection is included in the result of performing the voice recognition function, the digital assistant device 100 transmits the corresponding voice command, the identification information of the digital assistant device 100, the call transmitting request signal, etc. to the service server 200.

As an example, the digital assistant device 100 receives a voice (e.g., "NUGU, call my husband") through the transmitter, and performs a voice recognition function for the received voice.

In addition, the digital assistant device 100 determines whether the voice command for the call connection is included in the result of performing the voice recognition function, and as the determining result, when it is determined that the voice command (e.g., "call my husband") for the call connection for the call with the receiving terminal 500 of the husband is included in the result of performing the voice recognition function, the digital assistant device 100 transmits the voice command, the identification information of the digital assistant device 100, the call transmitting request signal, etc. to the service server 200.

In addition, when the call connection with the specific receiving terminal 500 is failed in response to the call transmitting request signal, the digital assistant device 100 receives information indicating that the call connection transmitted from the service server 200 has been failed.

As such, when the call connection is failed, the digital assistant device 100 may request an input of an additional voice command from the user and attempt the call connection again based on the voice command additionally input from the user.

Further, when the voice command for the call connection is included in the result of performing the voice recognition function and the call connection is required, the digital assistant device 100 performs the call connection function by the control of the service server 200.

Further, when the call channel with the receiving terminal 500 is normally connected by the control of the service server 200, the digital assistant device 100 performs a calling function with the receiving terminal 500 connected through communication via the service server 200 and the communication company server 400.

Further, when the call between the digital assistant device 100 and the transmitting terminal 500 is terminated, the digital assistant device 100 terminates the call connection with the receiving terminal 500 formed above by the control of the service server 200.

The service server 200 communicates with the digital assistant device 100, the transmitting terminal 300, the communication company server 400, the receiving terminal 500, etc.

Further, the service server 200 matches the identification information of a terminal (e.g., including the transmitting terminal 300, etc.) associated with the digital assistant device 100 with the identification information of the digital assistant device 100 to store (or manage) the matched information.

Further, the service server 200 provides (or installs) a dedicated application for the call transmission (or the call connection) to the transmitting terminal 300.

Further, the service server 200 stores information on a plurality of receivers transmitted from the transmitting terminal 300. Here, the receiver information (or recipient information) includes a name (or nickname/pet name), a phone number, an email address, social network account information, etc.

In addition, the service server 200 stores information on the digital assistant device 100 corresponding to a special number associated with the transmitting terminal 300. Through this, when the communication company server 400 wants to check the phone number of the receiving terminal 500 using the special number transmitted from the transmitting terminal 300, the service server 200 may check the digital assistant device 100 associated with the corresponding special number and check the phone number of the receiving terminal 500 by using the voice command transmitted from the checked digital assistant device 100.

Further, the service server 200 receives the voice command transmitted from the digital assistant device 100, the identification information of the digital assistant device 100, the call transmitting request signal, etc.

Further, the service server 200 checks the identification information of the transmitting terminal 300 corresponding to the identification information of the digital assistant device 100 received above in the identification information of the transmitting terminal by identification information of a plurality of digital assistant devices pre-stored. Here, the identification information of the transmitting terminal 300 includes a mobile directory number (MDN), a mobile IP, a mobile MAC, subscriber identity module (Sim) card unique information, a serial number, etc.

In addition, the service server 200 requests the call transmission to the transmitting terminal 300 corresponding to the checked identification information of the transmitting terminal 300.

At this time, when the service server 200 requests the call transmission to the transmitting terminal 300, the service server 200 calls a pre-installed dedicated application to the transmitting terminal 300, and then the service server 200 may also request the call transmission to the transmitting terminal 300 while the dedicated application is being executed in the transmitting terminal 300.

As an example, the service server 200 checks the identification information of the transmitting terminal 300 corresponding to the identification information of the digital assistant device 100 received above in the identification information of the transmitting terminal by the identification information of the plurality of digital assistant devices pre-stored.

In addition, the service server 200 calls the dedicated application pre-installed in the transmitting terminal 300 by interworking with the transmitting terminal 300 corresponding to the checked identification information of the transmitting terminal 300 and requests the call transmission to the corresponding transmitting terminal 300 while the dedicated application is being executed in the transmitting terminal 300.

Thereafter, the transmitting terminal 300 receives the call transmitting request transmitted from the service server 200, and requests the call transmission (or transmits the call transmitting request signal) to the communication company server 400 by using a predetermined special number (or specific number) in response to the corresponding transmitting terminal 300 by the dedicated application which is being executed in the corresponding transmitting terminal 300 in response to the received call transmitting request of the service server 200.

That is, the transmitting terminal 300 transmits to the communication company server 400 the call transmitting request signal including the special number, the identification information of the transmitting terminal 300 (or the phone number of the transmitting terminal 300), etc. by using the predetermined special number corresponding to the transmitting terminal 300 in response to the call transmitting request of the service server 200. Here, the special number may be a predetermined unique number to attempt the call connection by using the corresponding transmitting terminal 300.

As an example, the transmitting terminal 300 transmits to the communication company server 400 the call transmitting request signal including a predetermined special number (e.g., "010-9999-8888"), a phone number (e.g., "010-1234-5678") of the transmitting terminal 300, etc. in order to attempt the call connection with the corresponding transmitting terminal 300 in response to the call transmitting request transmitted from the service server 200 (S430).

Thereafter, the communication company server 400 receives the call transmitting request signal transmitted from the transmitting terminal 300 and checks a special number and transmitter information based on the received call transmitting request signal.

That is, the communication company server 400 receives the call transmitting request signal including the special number, the identification information of the transmitting terminal 300, etc. transmitted from the transmitting terminal 300.

Further, the communication company server 400 checks transmitter information corresponding to the identification information of the transmitting terminal 300 received above in the transmitter information corresponding to the pre-stored identification information of the transmitting terminal 300. Here, the transmitter information includes a name (or nickname/pet name), a phone number, an email address, social network account information, etc.

Further, the communication company server 400 transmits to the service server 200 a call processing request signal including the special number, the checked transmitter information, etc. in order to check the phone number of the receiving terminal 500 for the call connection with the transmitting terminal 300.

As an example, the communication company server 400 receives the call transmitting request signal including the special number (e.g., "010-9999-8888"), the phone number (e.g., "010-1234-5678") of the transmitting terminal 300, etc. which are transmitted from the transmitting terminal 300 and checks transmitter information (e.g., including Gil-dong, Hong, a phone number (010-1234-5678) corresponding to a first transmitting terminal, etc.) corresponding to the identification information of the transmitting terminal 300 in the transmitter information corresponding to the pre-stored identification information of the transmitting terminal.

Further, the communication company server 400 transmits to the service server 200 the call processing request signal including the special number (e.g., "010-9999-8888"), the checked transmitter information, etc.

Further, the service server 200 receives the call processing request signal including the special number, the transmitter information, etc. transmitted from the communication company server 400.

Further, the service server 200 checks the digital assistant device 100 associated with the corresponding special number and/or transmitter information based on the special number, the transmitter information, etc. included in the received call processing request signal.

That is, the service server 200 checks that the corresponding call processing request signal is a signal responding to the call transmitting request transmitted to the transmitting terminal 300 above and checks the digital assistant device 100 associated with the call transmitting request transmitted to the corresponding transmitting terminal 300.

Further, the service server 200 checks receiver information based on the voice command received from the checked digital assistant device 100. Here, the receiver information includes a name (or nickname/pet name), a phone number, an email address, social network account information, etc.

That is, the service server 200 checks receiver information which is a phone number corresponding to a name/nickname/pet name included in the voice command received above in a plurality of phone numbers (e.g., including names/nicknames/pet names, phone numbers, etc.) pre-registered in association with the corresponding transmitting terminal 300.

As the checking result, when the phone number (or transmitter information) corresponding to the name/nickname/pet name included in the voice command received above in the plurality of phone numbers pre-registered in association with the corresponding transmitting terminal 300 is not checked, the service server 200 transmits to the communication company server 400 information indicating that the receiver information is not checked and transmits to the digital assistant device 100 information indicating that the call connection has been failed.

In addition, as the checking result, when the phone corresponding to the name/nickname/pet name included in the voice command received above in the plurality of phone numbers pre-registered in association with the corresponding transmitting terminal 300 is checked, the service server 200 performs a call connection function between the service server 200 and the digital assistant device 100 in order to perform the call connection function via the corresponding service server 200.

Further, the service server 200 requests (or transmits) to the communication company server 400 a receiving call connection (or receiving call connection signal) with the receiving terminal 500 corresponding to the receiver information based on the receiver information checked above in response to the call processing request signal of the communication company server 400 above.

Further, when the call connection function between the receiving terminal 500 and the service server 200 is normally performed by the corresponding communication company server 400 according to the call processing request signal transmitted to the service server 200, the service server 200 may form (or configure) a first call channel which is a call channel between the digital assistant device 100 and the receiving terminal 500 via the communication company server 400.

Further, while the call between the digital assistant device 100 and the receiving terminal 500 is connected via the service server 200 and the communication company server 400, the service server 200 (or the communication company server 400) may form (configure) a second call channel between the transmitting terminal 300 and the receiving terminal 500 to maintain a state in which the call between the transmitting terminal 300 and the receiving terminal 500 is connected via the communication company server 400 in parallel. Here, the transmitting terminal 300 is not connected to the call with the corresponding receiving terminal 500 by using the phone number associated with the receiving terminal 500, but may maintain the call connected state with the corresponding receiving terminal 500 by using the special number predetermined in the corresponding transmitting terminal 300.

At this time, the communication company server 400 may maintain (form) the second call channel formed between the receiving terminal 500 and the transmitting terminal 300 in an idle state which is a state in which dummy voice traffic is occupied.

Further, while the transmitting terminal 300 and the receiving terminal 500 are subscribed to different communication companies, a plurality of different communication company servers 400 is configured between the transmitting terminal 300 and the receiving terminal 500, respectively, and the call connection among the transmitting terminal 300, the plurality of different communication company servers 400, and the receiving terminal 500 may also be maintained by mutual interworking (or mutual communication connection) of the plurality of different communication company servers 400.

As an example, the communication company server 400 performs a call connection function between the corresponding receiving terminal 500 and the service server 200 based on the receiving call connection with the receiving terminal 500 requested from the service server 200 in response to the call processing request signal transmitted above. Accordingly, a first call channel among the digital assistant device 100, the service server 200, the communication company server 400, and the receiving terminal 500 may be formed (or configured).

Further, the communication company server 400 forms a second call channel between the transmitting terminal 300 and the receiving terminal 500 in parallel, immediately or simultaneously when the first call channel among the digital assistant device 100, the service server 200, the communication company server 400, and the receiving terminal 500 is formed.

Thereafter, when the call connection between the digital assistant device 100 and the receiving terminal 500 is terminated, the communication company server 400 terminates (or releases) connections (or call connections) of the first call channel among the digital assistant device 100, the service server 200, the communication company server 400, and the transmitting terminal 300 which are connected in parallel and the second call channel among the transmitting terminal 300, the communication company server 400, and the receiving terminal 500, respectively.

That is, when the call connection between the digital assistant device 100 and the receiving terminal 500 is terminated, the communication company server 400 terminates the call connection among the digital assistant device 100, the service server 200, the communication company servers 400, and the transmitting terminal 300 and terminates the call connection among the transmitting terminal 300, the communication company servers 400, and the receiving terminal 500 after the corresponding call connection is terminated.

In addition, after the entire call connection is terminated, the communication company server 400 charges the call fee associated with the corresponding call connection to the corresponding transmitting terminal 300 and/or the receiving terminal 500.

As such, the actual call is performed between the digital assistant device 100 and the receiving terminal 500, but as the transmitting terminal 300 associated with the digital assistant device 100 maintains the communication state with the corresponding receiving terminal 500, the communication company server 400 may perform a fee charging function (or a call fee settlement function according to the call between the digital assistant device 100 and the receiving terminal 500) according to the call between the digital assistant device 100 and the receiving terminal 500 through the corresponding transmitting terminal 300.

Meanwhile, when the user is the receiver, the other user as the call opponent of the user is the transmitter, the user terminal is the receiving terminal, and the opponent terminal of the other user is the transmitting terminal, the configuration associated with supporting the call with the opponent terminal using the digital assistant device of the service system 10 supporting the call conversion between the digital assistant device of the user and the terminal is the same as described in FIG. 1 described above, and a flowchart for a service method associated with supporting the call with the opponent terminal using the digital assistant device is the same as described with reference to FIG. 5.

According to the configuration of the present invention described above, the user may freely perform the call with the opponent terminal by the digital assistant device while the operation or control of the user terminal is unnecessary by using a separate user terminal from the digital assistant device, but preventing an actual call through the user terminal and performing the call between the digital assistant device and the opponent terminal through a voice command of the user, when connecting the call between the digital assistant device of the user and the opponent terminal by an overall control of the service server, thereby increasing convenience in use.

Here, the user terminal may be the transmitting terminal or the receiving terminal, and the opponent terminal may also be the transmitting terminal or the receiving terminal.

Figure 8:
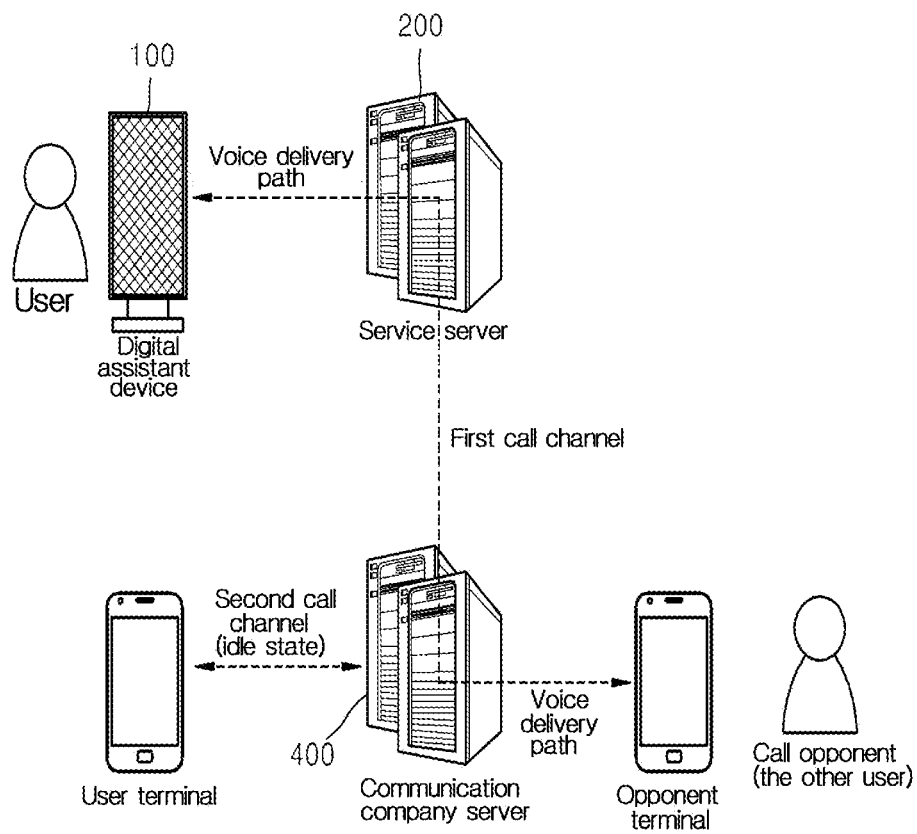
FIGS. 8 to 10 are operational exemplary diagrams associated with a call conversion in the service system supporting the call conversion between the digital assistant device and the terminal according to the embodiment of the present invention.
Figure 9:
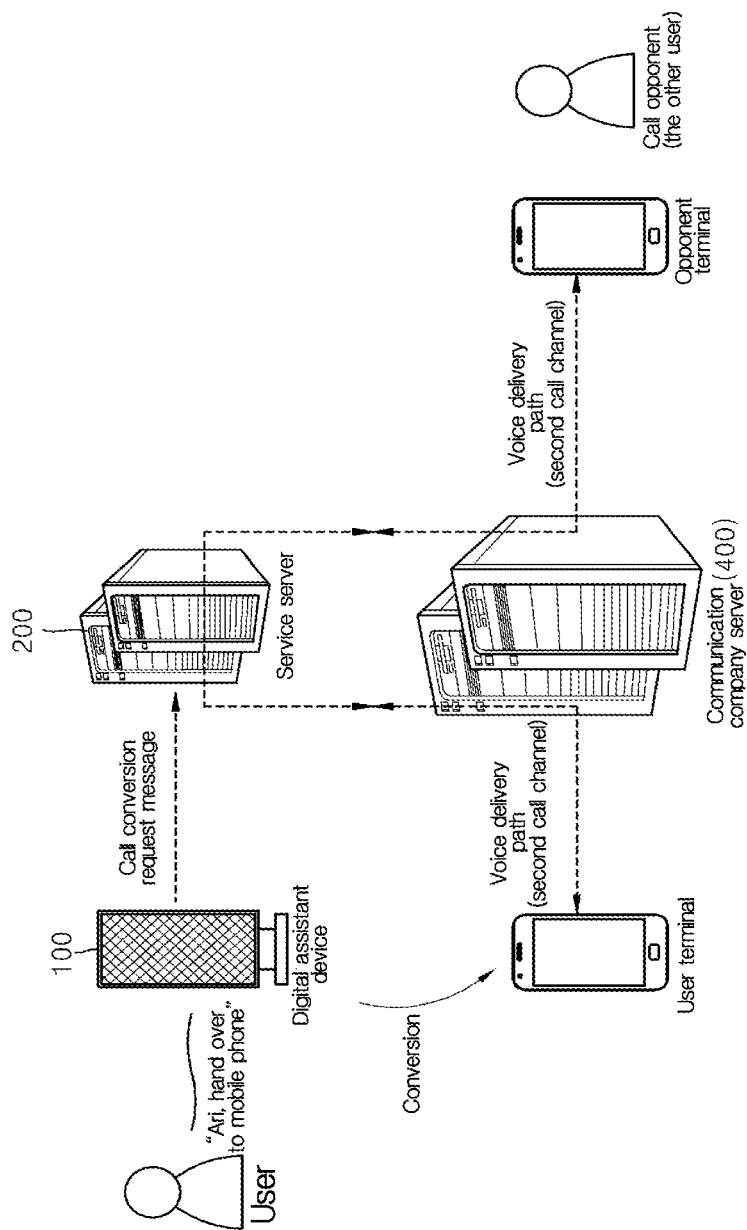

Meanwhile, according to the aforementioned configuration, while the call between the digital assistant device of the user and the opponent terminal is being connected, the service system 10 according to the present invention may change a calling means with the opponent terminal from the digital assistant device of the user to the user terminal according to a call means conversion request-related signal to the user terminal received from the digital assistant device recognizing the voice command of the user, and this will be described in detail with reference to the configuration of FIGS. 8 and 9.

First, as illustrated in FIG. 8, during the call connection between the digital assistant device 100 of the user and the opponent terminal through the communication company server 400, the digital assistant device 100 and the opponent terminal are call-connected to each other through the first call channel via the service server 200 and the communication company server 400 to be mutually called.

Further, while the call between the digital assistant device 100 and the opponent terminal is connected via the service server 200 and the communication company server 400, as described above, the service server 200 (or the communication company server 400) may form (configure) a second call channel between the user terminal and the opponent terminal through the communication company server 400 to maintain a state in which the call between the user terminal and the opponent terminal is being connected via the communication company server 400 in parallel.

At this time, the communication company server 400 may maintain the second call channel between the user terminal and the opponent terminal in an idle state which is a state in which dummy voice traffic is occupied.

Here, the communication company server 400 connects the second call channel for the call between the user terminal and the opponent terminal, but substantially, may form the first call channel and the second call channel which are formed between the user terminal and the communication company server 400 and are in a switchable state by interlocking the first call channel and the second call channel.

Meanwhile, as illustrated in FIG. 9, the digital assistant device 100 of the user may receive a voice command from the user calling with the opponent terminal through the digital assistant device 100 to recognize a voice command for a call conversion request when the corresponding voice command is the call conversion request for converting the calling means to the user terminal and generate a call conversion request message based on the voice command for the corresponding call conversion request.

Further, the digital assistant device 100 may transmit the corresponding call conversion request message to the service server 200 through a channel different from the first call channel.

As an example, the digital assistant device 100 may receive a voice (e.g., "Ari, hand over to the mobile phone") through the user, and perform a voice recognition function for the received voice.

Further, the digital assistant device 100 may determine whether the voice command for the call conversion request is included in the result of performing the voice recognition function. As the determining result, when it is determined that the voice command (e.g., "hand over to the mobile phone") for the call conversion request to the user terminal is included in the corresponding result of performing the voice recognition function, the digital assistant device 100 may generate a call conversion request message to transmit the generated call conversion request message to the service server 200.

At this time, the digital assistant device 100 may transmit the call conversion request message to the service server 200 by using a session initiation protocol (SIP).

The service server 200 may generate a call conversion request signal based on the corresponding call conversion request message when receiving the call conversion request message from the digital assistant device 100 to transmit the generated call conversion request signal to the communication company server 400.

At this time, the call conversion request message may include identification information of the digital assistant device 100, identification information of the user terminal, etc., and may further include identification information of the opponent terminal in a call connection state with the digital assistant device 100.

Further, the identification information of the opponent terminal may include a phone number of the opponent terminal, and the identification information of the user terminal may include a phone number of the user terminal.

Further, the call conversion request signal may equally include information included in the call conversion request message.

The communication company server 400 may check at least one of the identification information of the digital assistant device 100, the identification information of the user terminal, and the identification information of the opponent terminal corresponding to the call conversion request signal when receiving the call conversion request signal from the service server 200.

Further, the communication company server 400 may check the opponent terminal which is forming the first call channel with the digital assistant device 100 of the user based on the call conversion request signal and may check the second call channel formed in parallel with the first call channel between the opponent terminal and the user terminal by interworking with the corresponding first call channel.

Accordingly, the communication company server 400 may convert the second call channel from the idle state to the call connection state based on the call conversion request signal for converting the calling means to the user terminal from the digital assistant device 100.

At this time, when the second call channel is changed to the call connection state based on the call conversion request signal via the communication with the communication company server 400, the service server 200 may terminate the call connection to the first call channel between the digital assistant device 100 and the opponent terminal.

Further, the communication company server 400 may mediate a voice signal to be received from any one of the user terminal and the opponent terminal to the service server 200, and the service server 200 may transmit the voice signal to be received from the communication company server 400 to the communication company server 400 again based on the call conversion request signal to mediate the voice signal received from any one of the user terminal and the opponent terminal to be transmitted to the other one of the user terminal and the opponent terminal through the communication company server 400 again.

That is, the service server 200 may switch a delivery path of the voice signal from the first call channel to the second call channel so as to transmit the voice signal transmitted to the first call channel to the second call channel based on the call conversion request signal.

Through the aforementioned configuration, the service server 200 and the communication company server 400 may mediate the call between the user terminal and the opponent terminal after converting the calling means from the digital assistant device 100 of the user to the user terminal.

Figure 10:
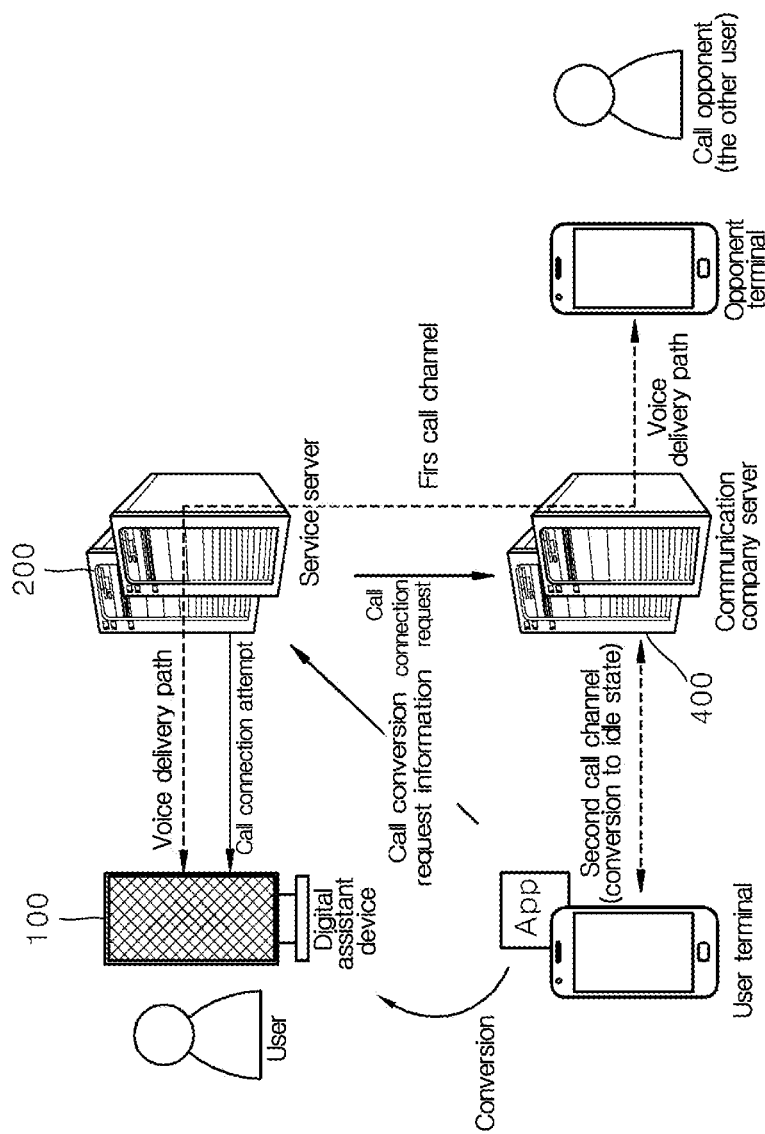

Meanwhile, the service system 10 according to the present invention may also support to change and call the calling means to the digital assistant device 100 of the user during the calling between the user terminal and the opponent terminal through the second call channel, and this will be described in detail with reference to FIG. 10.

First, the dedicated application installed in the user terminal may generate call conversion request information for changing the calling means to the digital assistant device 100 of the user from the user terminal to transmit the generated call conversion request information to the service server 200.

To this end, the dedicated application installed in the user terminal is executed by the control unit configured in the user terminal to output and provide an interface including a call conversion button on the display unit of the user terminal. When the corresponding call conversion button is selected based on a user input by the input unit configured in the user terminal, the dedicated application may generate call conversion request information including identification information (e.g., phone number) of the opponent terminal in a call connection state with the current user terminal, identification information of the predetermined digital assistant device 100, identification information of the user terminal, etc., to transmit the generated call conversion request information to the predetermined service server 200.

At this time, the call conversion request information may include the identification information of the digital assistant device 100, the identification information of the user terminal, etc., and further include the identification information of the opponent terminal.

Here, the identification information of the digital assistant device 100 includes a mobile IP, a mobile MAC, a serial number, etc.

In addition, the identification information of the user terminal and/or the opponent terminal includes a mobile directory number (MDN), a mobile IP, a mobile MAC, subscriber identity module (Sim) card unique information, a serial number, etc.

Further, the service server 20 may check (identify) a digital assistant device 100 of the user based on the identification information of the digital assistant device 100 included in the corresponding call conversion request information when receiving the call conversion request information from the user terminal.

At this time, in the service server 200, the identification information of the digital assistant device 100 of the user may be matched with the identification information of the user terminal and pre-stored. Accordingly, the dedicated application of the user terminal may generate the call conversion request information including the identification information of the user terminal and the identification information of the opponent terminal to transmit the generated call conversion request information to the service server 200, and the service server 200 may also check the identification information of the digital assistant device 100 of the user which is matched and pre-stored with the identification information of the user terminal according to the call conversion request information.

Further, the service server 200 may attempt the call connection to the digital assistant device 100 of the user checked in response to the call conversion request information.

At this time, the digital assistant device 100 of the user may generate a response signal in response to the corresponding voice command and then transmit the generated response signal to the service server 200 when recognizing the voice command for the call connection request of the user as described above.

Further, when the service server 200 receives the response signal from the digital assistant device 100 in response to the call connection attempt to the digital assistant device 100 of the user, the service server 200 may generate a call connection request signal for requesting the call connection between the digital assistant device 100 of the user and the opponent terminal in response to the corresponding response signal and then transmit the corresponding call connection request signal to the communication company server 400.

At this time, the service server 200 may generate a call connection request signal based on the call conversion request information and the response signal received from the dedicated application of the user terminal and the corresponding call connection request signal may include the identification information of the digital assistant device 100, the identification information of the opponent terminal, etc.

Further, the communication company server 400 may form a first call channel between the digital assistant device 100 and the opponent terminal when receiving the call connection request signal from the service server 200.

Through this, the service server 200 may mediate a voice signal to be transmitted/received between the digital assistant device 100 of the user and the opponent terminal through the corresponding first call channel together with the communication company server 400 by maintaining the first call channel formed by the communication company server 400, thereby making the call between the digital assistant device 100 and the opponent terminal.

Further, the communication company server 400 may change the second call channel to the idle state as described above while forming the first call channel.

Through the aforementioned configuration, the service server 200 may easily convert the calling means from the user terminal to the digital assistant device 100 in response to the user's request of requesting the calling means to be converted to the digital assistant device 100 of the user from the user terminal in the call connection state with the opponent terminal to process so that the user calls with the opponent terminal by using the digital assistant device 100.

As described above, the present invention supports the user which is calling by the digital assistant device 100 which recognizes and operates the voice command of the user and is callable with the opponent terminal to easily change the calling means to the user terminal by only the voice command for changing the calling means to the user terminal with respect to the digital assistant device 100. On the contrary, the present invention supports the user which is calling with the opponent terminal by using the user terminal to change the calling means to the digital assistant device 100 from the user terminal by inputting the voice command to the digital assistant device 100 when the call connection to the digital assistant device 100 is attempted by the service server 200 after the call conversion to the digital assistant device 100 is requested to the service server 200 by executing the dedicated application installed in the user terminal. In addition, the present invention supports the user to call with the opponent terminal easily by a desired calling means according to a situation, thereby greatly improving call convenience of the user using various calling means.

Meanwhile, when the digital assistant device 100 may recognize a user's voice command during the call connection with the opponent terminal according to the call connection through the first call channel and generate a recording request signal when the corresponding voice command is a recording request to the call contents to transmit the generated recording request signal to the service server 200.

At this time, the digital assistant device 100 may also transmit the corresponding recording request signal to the service server 200 through a separate communication network or channel from the first call channel.

Accordingly, the service server 200 may record the voice signal transmitted/received through the first call channel call-connected in response to the digital assistant device 100 transmitting the corresponding recording request signal when receiving the recording request signal from the digital assistant device 100 and generate and store recording information according to the record of the corresponding voice signal.

Further, the user terminal may execute the dedicated application during the call connection with the opponent terminal according to the call connection through the second call channel to generate the recording request signal based on the user input through the dedicated application and then transmit the corresponding recording request signal to the predetermined service server 200 through the dedicated application.

Further, the service server 200 may check the second call channel based on the corresponding recording request signal when receiving the recording request signal from the user terminal, record a voice signal transmitted/received through the corresponding second call channel, and generate and store recording information according to the recording of the corresponding voice signal.

That is, even when the call connection is made between the user terminal and the opponent terminal through the second call channel via the service server 200 and the communication company server 400 in response to the recording request signal when receiving the recording request signal, as described above, the service server 200 may record the voice signal transmitted/received through the second call channel as described above to generate the recording information described above and provide the generated recording information to the user terminal or the opponent terminal.

In this case, when a video call is made between the digital assistant device 100 and the opponent terminal through the first call channel or the video call is made between the user terminal and the opponent terminal through the second call channel, the service server 200 may record a video and a voice to store the generated video information as the corresponding recording information.

In addition, the service server 200 may match and store the recording information with at least one of the identification information of the digital assistant device 100 and the phone number of the user terminal included in the recording request signal.

Further, the service server 200 may transmit to the user terminal the recording information checked in response to the corresponding request information when receiving request information on the providing of the recording information including at least one of the identification information of the digital assistant device 100 and the phone number of the user terminal from the user terminal.

At this time, the service server 200 may transmit the recording information to the opponent terminal even when receiving a request for providing the recording information from the opponent terminal.

Through the above-described configuration, when the user terminal and/or the digital assistant device 100 does not support the recording function, the user terminal and/or the digital assistant device 100 may record the call contents through the service server 200, thereby increasing the user's convenience.

As described above, the present invention supports the user which is calling by the digital assistant device which recognizes and operates the voice command of the user and is callable with the opponent terminal to easily change the calling means to the user terminal by only the voice command for changing the calling means to the user terminal with respect to the digital assistant device. On the contrary, the present invention supports the user which is calling with the opponent terminal by using the user terminal to change the calling means to the digital assistant device from the user terminal by inputting the voice command to the digital assistant device when the call connection to the digital assistant device is attempted by the service server after the call conversion to the digital assistant device is requested to the service server by executing the dedicated application installed in the user terminal. In addition, the present invention supports the user to call with the opponent terminal easily by a desired calling means according to a situation, thereby greatly improving call convenience of the user using various calling means.

According to the present invention, the user may freely perform a call with the opponent terminal by the digital assistant device while the operation or control of the user terminal is unnecessary by using the user terminal of the user, but preventing an actual call through the user terminal and performing a call between the digital assistant device and the opponent terminal through the voice command of the user, when connecting the call between the digital assistant device of the user and the opponent terminal by an overall control of a service server, thereby increasing convenience in use.

Furthermore, according to the present invention, since the call contents between the other user corresponding to the opponent terminal and the user are recorded by the service server connecting the call between the digital assistant device and the opponent terminal instead of the user terminal and the recording information on the generated call contents may be provided to the user terminal, even though the user terminal or the digital assistant device does not support the recording function, the service server provides a recording function, thereby increasing user's convenience to the recording.

The service system supporting the voice call using the digital assistant device according to the embodiment of the present invention can be prepared with a computer program, and codes and code segments constituting the computer program may be easily deduced by a computer programmer in the art. Further, the corresponding computer program is stored in a computer readable media and read and executed by the computer or the digital assistant device, the service server, the transmitting terminal, the communication company server, the receiving terminal, etc. according to the embodiment of the present invention to implement the service system supporting the voice call using the digital assistant device.

The computer readable media include a magnetic recording medium and an optical recording medium. The computer program implementing the service system supporting the voice call using the digital assistant device according to the embodiment of the present invention may be stored and installed in internal memories of the digital assistant device, the service server, the transmitting terminal, the communication company server, the receiving terminal, etc. Alternatively, an external memory such as a smart card which stores and installs the computer program implementing the service system supporting the voice call using the digital assistant device according to the embodiment of the present invention may also be mounted in the service system supporting the voice call using the digital assistant device through the interface.

According to the present invention, a user may not only freely perform a call with an opponent terminal through a digital assistant device while an operation or control of a user terminal is unnecessary, thereby increasing convenience in use, but also according to a situation, the call with the opponent terminal may be supported to be easily made by a user's desired call means of the digital assistant device of the user and the user terminal, thereby greatly improving call convenience of the user using various call means. Therefore, the present invention can be widely used in the auxiliary device field, the call field, the terminal field, the server field, etc.

The aforementioned contents can be corrected and modified by those skilled in the art without departing from the essential characteristics of the present invention. Accordingly, the various embodiments disclosed in the present invention are not intended to limit the technical spirit but describe the present invention and the technical spirit of the present invention is not limited by the following embodiments. The protection scope of the present invention should be construed based on the following appended claims and it should be appreciated that the technical spirit included within the scope equivalent to the claims belongs to the present invention.

What is claimed is:

1. A service method supporting a voice call using a digital assistant device, the service method comprising:
    a checking step of checking, by a service server, a digital assistant device associated with a receiving number and receiver information included in a call processing request signal transmitted from a communication company server;
    a call connecting step of attempting, by the service server, a call connection to the digital assistant device checked based on the call processing request signal while attempting a call connection to a receiving terminal corresponding the receiving number checked based on the call processing request signal through the communication company server;
    a response step of requesting, by the service server, a call connection between a transmitting terminal and the digital assistant device to the communication company server based on a response signal received from the digital assistant device which recognizes a voice command for a call connection request of the receiver in response to the call connection attempt; and
    a call connection step of maintaining, by the service server, a call channel between the digital assistant device and the transmitting terminal formed by the communication company server in response to the requested call connection.

2. The service method of claim 1, further comprising:
    before the checking step,
    checking, by the communication company server, identification information of the digital assistant device corresponding to the receiving number according to a call transmitting signal in identification information of the digital assistant device for each of a plurality of different receiving numbers pre-stored based on the receiving number included in the call transmitting signal received from the transmitting terminal and transmitting, to the service server, the call processing request signal including the receiving number according to the transmitting number of the transmitting terminal and the call transmitting signal and the checked identification information of the digital assistant device.

3. The service method of claim 1, further comprising:
    forming, by the communication company server, another call channel between the receiving terminal and the transmitting terminal in parallel when the call channel between the digital assistant device and the transmitting terminal is formed via the service server and the communication company server.

4. The service method of claim 3, further comprising:
    releasing, by the communication company server, a connection state of another call channel between the transmitting terminal and the receiving terminal when the call between the digital assistant device and the transmitting terminal is terminated.

5. The service method of claim 1, further comprising:
    generating, by the service server, recording information by recording a signal transmitted/received through the call channel according to a recording request signal received from the digital assistant device to transmit the generated recording information to the receiving terminal.

6. A service method supporting a voice call using a digital assistant device comprising: while a call channel between a user terminal of a user and an opponent terminal as a call opponent is connected by a communication company server communicating with a service server,
    receiving, by the service server, call conversion request-related call conversion request information including identification information of the user terminal and identification information of the opponent terminal generated through a dedicated application of the user terminal;
    checking, by the service server, a digital assistant device of the user based on the identification information of the digital assistant device pre-stored in response to the identification information of the user terminal according to the call conversion request information and attempting a call connection to the digital assistant device;

requesting, by the service server, a call connection between the opponent terminal and the digital assistant device to the communication company server based on a response signal received from the digital assistant device which recognizes a call connection-related voice command of the user; and forming, by the communication company server, another call channel different from the call channel between the digital assistant device and the opponent terminal in response to the call connection-related request and converting the call channel between the user terminal and the opponent terminal to an idle state.

* * * * *